US008666173B2

(12) United States Patent
Huggett

(10) Patent No.: US 8,666,173 B2
(45) Date of Patent: Mar. 4, 2014

(54) MATCHING INTEREST POINTS

(75) Inventor: Anthony R Huggett, Basingstoke (GB)

(73) Assignee: Aptina Imaging Corporation, George Town (KY)

( * ) Notice: Subject to any disclaimer, the term of this patent is extended or adjusted under 35 U.S.C. 154(b) by 336 days.

(21) Appl. No.: 13/149,824

(22) Filed: May 31, 2011

(65) Prior Publication Data

US 2012/0183228 A1 Jul. 19, 2012

(30) Foreign Application Priority Data

Jan. 18, 2011 (GB) .................................. 1100850.5

(51) Int. Cl.
*G06K 9/00* (2006.01)
(52) U.S. Cl.
USPC .......................................... 382/219; 382/154
(58) Field of Classification Search
USPC .................................................. 382/219, 154
See application file for complete search history.

(56) References Cited

U.S. PATENT DOCUMENTS

| 6,711,293 | B1 * | 3/2004 | Lowe | 382/219 |
|---|---|---|---|---|
| 2004/0184662 | A1 * | 9/2004 | Kravec et al. | 382/219 |
| 2009/0161946 | A1 * | 6/2009 | Sato et al. | 382/154 |
| 2009/0169107 | A1 | 7/2009 | Chien et al. | |
| 2010/0080469 | A1 | 4/2010 | Liu et al. | |
| 2010/0169576 | A1 | 7/2010 | Chen | |
| 2010/0310177 | A1 * | 12/2010 | Xiong et al. | 382/201 |

FOREIGN PATENT DOCUMENTS

| CN | 1987928 | 6/2007 |
|---|---|---|
| CN | 101488217 | 7/2009 |
| KR | 200920452 | 2/2009 |
| WO | 03009579 | 1/2003 |
| WO | 2004055724 | 7/2004 |

OTHER PUBLICATIONS

Huggett, Anthony, GB Patent Application #1100850.5, filed Jan. 18, 2011.
Kirsch, Graham, GB Patent Application #1100848.9, filed Jan. 18, 2011.
H. Bay, "From Wide-baseline Point and Line Correspondences to 3D", Ph.D. Thesis, ETH Zurich, 2006 [online], [retrieved on Jun. 17, 2011]. Retrieved from the Internet: <URL:http://e-collection.library.ethz.ch/eserv/eth:288171/eth-28817-01.pdf> and <URL:http://e-collection.library.ethz.ch/eserv/eth:28817/eth-28817-02.pdf>.

(Continued)

*Primary Examiner* — Hadi Akhavannik

(57) ABSTRACT

Interest points are markers anchored to a specific position in a digital image of an object. They are mathematically extracted in such a way that, in another image of the object, they will appear in the same position on the object, even though the object may be presented at a different position in the image, a different orientation, a different distance or under different lighting conditions. The goal is to match interest points in one image with corresponding interest points in another image. Typically, this involves the construction of a descriptor, which is both computationally expensive and resource-intensive. Methods and devices are described that match interest points without the construction of conventional descriptors and that permit the use of spatial coherency information to increase the accuracy of the match.

17 Claims, 14 Drawing Sheets

(56) References Cited

OTHER PUBLICATIONS

Lowe, David G., "Distinctive Image Features from Scale-Invariant Keypoints", Journal Name: International Journal of Computer Vision, Cover Date: Nov. 1, 2004, Publisher: Springer Netherlands, Issn: 0920-5691, Subject: Computer Science, Start Page: 91, End Page: 110, vol. 60, Issue: 2, Url: http://dx.doi.org/10.1023/B:VISI.0000029664.99615.94, Doi: 10.1023/B:VISI.0000029664.99615.94, [online], [retrieved on Jun. 17, 2011]. Retrieved from the Internet: <URL:http://people.cs.ubc.ca/~lowe/papers/ijcv04.pdf>.

Herbert Bay, Andreas Ess, Tinne Tuytelaars, Luc Van Gool, "SURF: Speeded Up Robust Features", Computer Vision and Image Understanding (CVIU), vol. 110, No. 3, pp. 346-359, 2008, [online], [retrieved on Jun. 17, 2011]. Retrieved from the Internet: <URL:ftp://ftp.vision.ee.ethz.ch/publications/articles/eth_biwi_00517.pdf>.

Bay, Herbert, Tuytelaars, Tinne, Van Gool, Luc, "SURF: Speeded Up Robust Features", Computer Vision—ECCV 2006, Lecture Notes in Computer Science, Copyright: 2006, Publisher: Springer Berlin / Heidelberg, Start Page: 404, End Page: 417, vol. 3951, <Url: http://dx.doi.org/10.1007/11744023_32>.

S. Winder, Gang Hua, M. Brown, "Picking the best DAISY," cvpr, pp. 178-185, 2009 IEEE Conference on Computer Vision and Pattern Recognition, 2009.

"Tutorials—SIFT", VLFeat.org, [online], [retrieved on Jun. 17, 2011]. Retrieved from the Internet: <URL:http://www.vlfeat.org/overview/sift.htmlf>.

Kirsch, Graham, U.S. Appl. No. 13/161,324, filed Jun. 15, 2011.

* cited by examiner

ANY TWO INTEREST POINTS

WORM STARTING FROM BASE POINT

WORM SCALED AND ROTATED ACCORDING TO BASE POINT

FIGURE 8A

| 3 | $b_{ij}$ | $q_1$ | $q_2$ | $q_3$ | $q_4$ |
|---|---|---|---|---|---|
| | $p_1$ | 2 | 0 | 0 | 0 |
| | $p_2$ | 0 | 2 | 0 | 0 |
| | $p_3$ | 0 | 0 | 1 | 1 |
| | $p_4$ | 0 | 0 | 1 | 1 |

SECOND MAXIMUM $s_{22}$ FOUND. INCREASE BELIEF $b_{22}$ AND DECREASE (TO ZERO) BELIEF IN OTHER MATCHES FOR $p_2$ AND $q_2$

INCREASED BELIEF $b_{22}$ INCREASES SCORE $s_{22}$, BECAUSE $v_{22}$ WITH HEAD $p_1$ MATCHES $w_{22}$ WITH HEAD $q_1$

| $s_{ij}$ | $q_1$ | $q_2$ | $q_3$ | $q_4$ |
|---|---|---|---|---|
| $p_1$ | 3 | 0 | 0 | 0 |
| $p_2$ | 0 | 3 | 0 | 0 |
| $p_3$ | 0 | 0 | 1 | 0 |
| $p_4$ | 0 | 0 | 0 | 3 |

| 4 | $b_{ij}$ | $q_1$ | $q_2$ | $q_3$ | $q_4$ |
|---|---|---|---|---|---|
| | $p_1$ | 2 | 0 | 0 | 0 |
| | $p_2$ | 0 | 2 | 0 | 0 |
| | $p_3$ | 0 | 0 | 1 | 0 |
| | $p_4$ | 0 | 0 | 0 | 2 |

THIRD MAXIMUM $s_{44}$ FOUND. INCREASE BELIEF $b_{44}$ AND DECREASE (TO ZERO) BELIEF IN OTHER MATCHES FOR $p_4$ AND $q_4$

INCREASES BELIEF $b_{44}$ INCREASES SCORE $s_{33}$, BECAUSE $v_{31}$ WITH HEAD $p_4$ MATCHES $w_{31}$ WITH HEAD $q_4$

| $s_{ij}$ | $q_1$ | $q_2$ | $q_3$ | $q_4$ |
|---|---|---|---|---|
| $p_1$ | 4 | 0 | 0 | 0 |
| $p_2$ | 0 | 3 | 0 | 0 |
| $p_3$ | 0 | 0 | 2 | 0 |
| $p_4$ | 0 | 0 | 0 | 3 |

FIG. 8B

MATCHING INTEREST POINTS

This application claims priority under 35 U.S.C. §119 to United Kingdom patent application UK 1100850.5, filed Jan. 18, 2011, which is hereby incorporated by reference herein in its entirety.

BACKGROUND

Interest points are markers anchored to a specific position in a digital image of an object. They are mathematically extracted in such a way that, in another image of the object, they will appear in the same position on the object, even though the object may be presented at a different position in the image, a different orientation, a different distance or under different lighting conditions. Good interest point detectors produce a number of stable interest points.

The goal is to match interest points in one image with corresponding interest points in another image. This is the key process behind a wide range of detection, recognition, segmentation and tracking problems. Conventionally, to match interest points, descriptors are constructed. Interest points and descriptors are used to identifying and correlate related regions in two or more images, such as frames in a video stream. Descriptors are local statistics of a patch of the image around each interest point, typically a local histogram of gradients. Rotation and scale invariance may be obtained by transforming the patch according to the scale and principal direction of the interest point prior to computation. Popular types of interest point descriptors are the SIFT descriptor, discussed in Lowe, D. G.: "Distinctive Image Features", International Journal of Computer Vision, 2004, and Microsoft's daisy, for which see Winder, S., Hua, G., & Brown, M.: "Picking the Best Daisy", CVPR (Computer Vision and Pattern Recognition), 2009.

With local descriptors, objects are identified by placing the descriptors for a reference image (desired object) into an unstructured list. To identify the same object in a test image, interest point descriptors are computed for the interest points in the test image. A sufficient number of sufficiently close descriptors indicates that the desired object is present in the test image.

There are a number of drawbacks with this technique. Image descriptors require a great deal of processing to generate them. They are not particularly compact. Indeed, the descriptor data for a typical image can exceed the size of the image data, which creates a bandwidth problem in real-time processing. Moreover, the conventional approach takes no account of the spatial positioning or orientation of one interest point relative to another.

DETAILED DESCRIPTION

Figure 1:
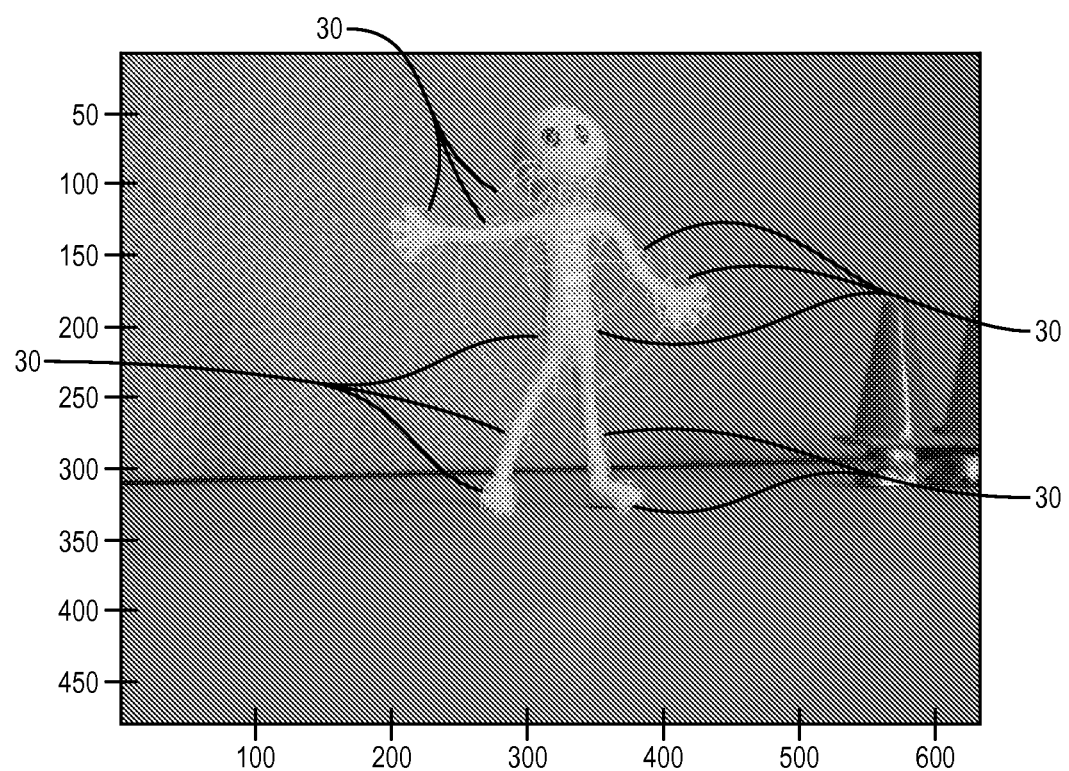
FIG. 1 shows an example image with interest points superimposed in accordance with an embodiment of the present invention.

Embodiments of the invention presented here were conceived as a way of matching interest points from one image with interest points in another image or series of images without having to compute descriptors. They do so by relating interest points using objects that will be termed "worms". The origin of this nomenclature will become clear later on. Each worm relates two interest points, one of which will be termed a "base interest point" and the other of which will be termed a "satellite interest point". The choice of the terms "base" and "satellite" is an arbitrary one, but useful on a conceptual level. Each worm represents the position of the satellite interest point relative to the base interest point and the scale and orientation of the satellite interest point, but in each case the position, scale and orientation is "normalized", which here means expressed relative to the scale and orientation of the base interest point. First the worms generated from the interest points of two images are matched and then, from the matched worms, the interest points that are to be matched across images are determined and matched.

Although a feature of these embodiments of the invention is that there is no need to compute any descriptors, the reader will understand that the computation of descriptors to provide additional information to be used in matching interest points is not excluded.

Therefore, one embodiment of the invention is a method of matching interest points between images comprising:

from a dataset of interest points in a first image, the dataset comprising information identifying the position, scale and orientation of each interest point, calculating a dataset of objects that each relate a base interest point to a satellite interest point, the calculated dataset comprising information identifying the normalized position of the satellite interest point relative to the base interest point and the normalized scale and orientation of the satellite interest point, in which normalized means expressed relative to the scale and orientation of the base interest point;

from a dataset of interest points in a second image, the dataset comprising information identifying the position, scale and orientation of each interest point, calculating a second dataset of objects that each relate a base interest point to a satellite interest point, the calculated dataset comprising information identifying the normalized position of the satellite interest point relative to the base interest point and the normalized scale and orientation of the satellite interest point, in which normalized means expressed relative to the scale and orientation of the base interest point;

generating matched pairs of objects by matching objects from the first calculated dataset to objects in the second calculated dataset;

from the matched pairs of objects, determining the interest points in the first dataset that are to be matched with interest points in the second dataset; and matching the interest points accordingly.

For reasons of computational efficiency, it is not necessary to create worm objects linking each pair of interest points in an image. Instead, for each base interest point in the first or second dataset of interest points, the first calculated dataset of objects may contain objects that relate that base interest point to a set of satellite interest points that is at most a subset of the remaining interest points in the dataset in question. Since the relationship between nearby interest points is more likely to yield information permitting interest points to be matched than the relationship between distant interest points, the subset of the remaining interest points in the dataset may contain the n interest points that are closest in position to the base interest point in question, where n is an integer. In certain embodiments, it may contain only those n interest points. The value of n can be chosen at will. In certain embodiments it is at least 8, at most 128, or both. Between 16 and 64 can be an appropriate choice.

To put these ideas into effect in a concrete way, the method may comprise:

for each of a plurality of base interest points in the first dataset of interest points, identifying as satellite interest points a set of the n remaining interest points in the first dataset of interest points that are closest to the interest point in question; and for each of the n satellite interest points so identified, calculating an object that relates the base interest point to the satellite interest point, comprising information identifying the normalized position of the satellite interest point relative to the base interest point and the normalized scale and orientation of the satellite interest point, in which normalized means expressed relative to the scale and orientation of the base interest point.

The same applies, mutatis mutandis, to the second dataset of interest points.

The process of matching the worm objects from the first calculated dataset to worm objects in the second calculated dataset may comprise calculating a measure of the similarity of an object from the first calculated dataset to an object in the second calculated dataset and matching the objects only if the calculated similarity measure meets a threshold condition. The similarity measure may be a numerical measure, and the threshold condition may be that the similarity measure is no greater than a given threshold value. This provides a straightforward method of determining the similarity of worm objects.

In certain embodiments of the invention presented here, the similarity measure is calculated from a first measure of the similarity of the normalized position of the satellite interest points represented by the objects and a second measure of the similarity of the normalized scale and orientation of the satellite interest points represented by the objects. The similarity measure may, for example, be calculated by summing the first measure and the second measure either as a direct sum or as a weighted sum. The weights chosen for the weighted sum may depend upon the circumstances and in particular the relative importance to be attached to matching the relative position, scale and orientation of the interest points. Separately calculating two similarity measures to be combined is a convenient way of allowing this to be achieved.

Conveniently, therefore, each of the worm objects in the first or second dataset of objects may include a first component and a second component, the first component independently identifying the normalized position of the satellite interest point relative to the base interest point and the second component independently identifying the normalized scale and orientation of the satellite interest point. The first component may be a vector, the magnitude of which represents the normalized distance between the base and the satellite interest points, and the direction of which represents the direction from the base interest point to the satellite interest point relative to the orientation of the base interest point. The second component may also be a vector, the magnitude of which represents the normalized scale of the satellite interest point, and the direction of which represents the orientation of the satellite interest point relative to the orientation of the base interest point. The vectors may be represented in the object in Cartesian form or in polar form or in some other form.

This object structure simplifies the calculation of the aforementioned similarity measure since, when each of the objects in the first and second datasets of objects includes a first component and a second component, the first component independently identifying the normalized position of the satellite interest point relative to the base interest point and the second component independently identifying the normalized scale and orientation of the satellite interest point, the aforementioned first measure can be a measure of the similarity of the first components and the aforementioned second measure a measure of the similarity of the second components.

More particularly, where the first component is a vector, the magnitude of which represents the normalized distance between the base and the satellite interest points, and the direction of which represents the direction from the base interest point to the satellite interest point relative to the orientation of the base interest point, the first measure can be a function of the magnitude of the vector difference between the first component vectors and the magnitude of one or both of the first component vectors of the objects concerned. For example, the first measure can be a function of the magnitude of the vector difference divided by the magnitude of one of the first component vectors. An example would be some constant times the square of the magnitude of the vector difference divided by the square of the magnitude of the first component vector of the object in the first dataset of objects and this is the example that is used in the specific embodiment of the invention that will be described later.

The same applies, mutatis mutandis, where the second component is a vector, the magnitude of which represents the normalized scale of the satellite interest point, and the direction of which represents the orientation of the satellite interest point relative to the orientation of the base interest point. The second measure can, for example, be some constant times the square of the magnitude of the vector difference divided by the square of the magnitude of the second component vector of the object in the first dataset of objects.

The two constants may be the same, for example unity, or they may be different where a weighted sum is to be used.

A feature of the methods presented here is that the interest points to be matched can be determined from nothing more than the identities of the interest points and the number of matched pairs of objects that relate them as base interest points. For example, the interest points that have a maximum number of matched pairs of objects that relate them as base interest points can be matched, or an interest point can be matched to the interest point to which it is related by the most matched pairs of objects that relate them as base interest points.

Thus, to put these ideas in more concrete terms, certain embodiments of the invention may comprise identifying a pair of interest points that have a maximum number of matched pairs of objects relating them, and matching the pair of interest points so identified. A further unmatched pair of interest points that have a maximum number of matched pairs of objects relating them may be identified and matched. The process can continue in this way. Thus, certain embodiments of the invention may further comprise continuing to identify unmatched pairs of interest points that have a maximum number of matched pairs of objects relating them, and matching the pairs of interest points so identified, until a termination condition is met. The termination condition can be set at will, but may for example be that the maximum number of matched pairs of objects relating unmatched interest points falls below a threshold number or, especially where the method is performed by a device, that a certain period of time has elapsed or a certain number of interest points have been matched.

The process of identifying the unmatched interest points related by a maximum number of matched pairs of objects can be simplified and facilitated by the use of an array in which each row represents a particular interest point in the first dataset, each column represents a particular interest point in the second dataset and each element has a value that represents the number of matched pairs of objects that relate the interest point of the corresponding row and the interest point of the corresponding column as base interest points. An element in the array can then be located that has a value representing a maximum number of matched pairs of objects to identify the pair of interest points corresponding to the row and column of that array element and that pair of interest points can be matched.

Thus, certain embodiments of the invention may comprise:
constructing a first array in which:
each row of the first array represents a particular interest point in the first dataset;
each column of the first array represents a particular interest point in the second dataset; and
each element of the first array has a value that represents the number of matched pairs of objects that relate the interest point of the corresponding row and the interest point of the corresponding column as base interest points;
locating an element in the first array that has a value representing a maximum number of matched pairs of objects to identify the pair of interest points corresponding to the row and column of that array element; and
matching the pair of interest points so identified.

The first array can be constructed from the datasets of objects calculated according to the embodiments of the invention already discussed, but in other embodiments of the invention, it may be constructed from pre-calculated datasets of worm objects.

Setting each element of the first array to a value that represents the number of matched pairs of objects that relate the interest point of the corresponding row and the interest point of the corresponding column as base interest points can be done in a number of ways. One way is to initialize the elements of the first array to default values representative of no matched pairs of objects and, for every matched pair of objects that relates an interest point in the first dataset and an interest point in the second dataset as base interest points, adjusting the value of the element of the first array that is in the row corresponding to the interest point in the first dataset and the column corresponding to the interest point in the second dataset, so as to increase by one the number of matched pairs of objects it represents.

A simple way of having the value of the array elements represent the number of matched pairs of objects is for each element of the first array to have a value equal to the number of matched pairs of objects that relate the interest point of the corresponding row and the interest point of the corresponding column as base interest points. In this way, the first array can be constructed by initializing the elements of the first array to zero and, for every matched pair of objects that relates an interest point in the first dataset and an interest point in the second dataset as base interest points, increasing by one the value of the element of the first array that is in the row corresponding to the interest point in the first dataset and the column corresponding to the interest point in the second dataset.

A feature of the embodiments of the invention presented here is that each of the worm objects relates two identified interest points. Take the case of two interest points that have not yet been matched. Each is associated, as a base interest point, with many satellite interest points via worm objects. If two of the worm objects have been matched because they are similar, then it is unlikely that they relate base interest points that should be matched to satellite interest points that should not and vice versa. It is much more likely that the matched worm objects relate base interest points that should be matched to satellite interest points that should also be matched, or that the match between the two worm objects is an artifact and neither the base interest points nor the satellite interest points are a true match. In view of this, it becomes possible to say that if two worm objects are matched and the satellite interest points to which they relate have also been matched, it becomes more likely that the base interest points should be matched. The method presented here makes use of this spatial coherency by treating the matched satellite interest point as though they are additional matched worm objects of the base interest points in question.

To achieve this, certain embodiments of the invention may further comprise:
in respect of a matched pair of objects that relates a base interest point to a satellite interest point in the first dataset and a base interest point to a satellite interest point in the second dataset, for which the satellite interest point in the first dataset and the satellite interest point in the second dataset are a matched pair, adjusting the value of the element of the first array that is in the row corresponding to the base interest point in the first dataset and the column corresponding to the base interest point in the second dataset, so as to increase the number of matched pairs of objects it represents;
then identifying an unmatched pair of interest points that have a maximum number of matched pairs of objects relating them as base interest points; and
matching the pair of base interest points so identified.

For overall consistency, this can be done for all matched pairs of worm objects.

As each pair of interest points is matched, it then becomes a candidate matched pair of satellite interest points for the process just described and the process can be repeated. This permits the latest information on which interest points have been matched to be fed through automatically to subsequent matching of interest points. To achieve this, certain embodiments of the invention may further comprise:

in respect of a matched pair of objects that relates base interest points in the first and second datasets to the pair of base interest points whose identities are so determined as satellite interest points, adjusting the value of the element of the first array that is in the row corresponding to the base interest point in the first dataset and the column corresponding to the base interest point in the second dataset, so as to increase the number of matched pairs of objects it represents;

then determining the identity of an unmatched pair of base interest points that have a maximum number of matched pairs of objects relating them; and matching the pair of base interest points whose identities are so determined.

The process can then be iterated by:

continuing, in respect of matched pairs of objects that relate base interest points to the pair of base interest points whose identities are so determined as satellite interest points, to adjust the values of the corresponding elements of the first array, so as to increase the number of matched pairs of objects they represent, to determine the identities of an unmatched pair of base interest points that have a maximum number of matched pairs of objects relating them and to match the pairs of base interest points whose identities are so determined;

until a termination condition is met.

For the same reasons, but in this case to propagate information about interest points that are less likely to be matches for one another, certain embodiments of the invention may further comprise:

in respect of a matched pair of objects that relates base interest points in the first and second datasets or images to one of the pair of base interest points whose identities are so determined and one other interest point as satellite interest points, adjusting the value of the element of the first array that is in the row corresponding to the base interest point in the first dataset or image and the column corresponding to the base interest point in the second dataset or image, so as to decrease the number of matched pairs of objects it represents;

then determining the identity of an unmatched pair of base interest points that have a maximum number of matched pairs of objects relating them; and matching the pair of base interest points whose identities are so determined.

This process can also be iterated by:

continuing, in respect of matched pairs of objects that relate base interest points to one of the pair of base interest points whose identities are so determined and one other interest point as satellite interest points, to adjust the values of the corresponding elements of the first array, so as to decrease the number of matched pairs of objects they represent, to determine the identities of an unmatched pair of base interest points that have a maximum number of matched pairs of objects relating them and to match the pairs of base interest points whose identities are so determined;

until a termination condition is met.

It is easier to keep track of the relationships between matched worm objects and matched interest points for the purposes of maintaining spatial coherency as just described by making use of a second array in which each row of the second array represents a respective interest point in the first dataset, each column of the second array represents a respective interest point in the second dataset and the elements of the second array are used to represent the confidence with which the corresponding interest points have been matched and are initialized to default values. When a pair of interest points is matched, the element of the second array that is in the row corresponding to the interest point of the matched pair in the first dataset and the column corresponding to the interest point of the matched pair in the second dataset is adjusted so as to increase the confidence it represents and every other element of the second array that is in the row corresponding to the interest point of the matched pair in the first dataset or the column corresponding to the interest point of the matched pair in the second dataset is adjusted so as to decrease the confidence it represents. The second series of adjustments is made as a result of an a priori condition that each interest point in one image is only to be matched with one interest point in the second image.

Once these adjustments of the second array have been made, spatial coherency information is fed back to the first array. In particular, for every matched pair of objects that relates a base interest point to a satellite interest point in the first dataset and a base interest point to a satellite interest point in the second dataset, the value of the element of the first array that is in the row corresponding to the base interest point in the first dataset and the column corresponding to the base interest point in the second dataset, is established or re-established so that the number of matched pairs of objects it represents depends upon the confidence represented by the element of the second array that is in the row corresponding to the satellite interest point in the first dataset and the column corresponding to the satellite interest point in the second dataset, wherein the greater the confidence represented by the element in the second array, the higher the number of matched pairs of objects represented by the element of the first array after it is adjusted.

To put these ideas into effect, certain embodiments of the invention presented here may comprise:

constructing a second array in which:

each row of the second array represents a respective interest point in the first dataset;

each column of the second array represents a respective interest point in the second dataset; and the elements of the second array are used to represent the confidence with which the corresponding interest points have been matched and are initialized to default values;

for a matched pair of interest points:

adjusting the element of the second array that is in the row corresponding to the interest point of the matched pair in the first dataset and the column corresponding to the interest point of the matched pair in the second dataset so as to increase the confidence it represents; and adjusting every other element of the second array that is in the row corresponding to the interest point of the matched pair in the first dataset or the column corresponding to the interest point of the matched pair in the second dataset so as to decrease the confidence it represents; and for every matched pair of objects that relates a base interest point to a satellite interest point in the first dataset and a base interest point to a satellite interest point in the second dataset, adjusting the value of the element of the first array that is in the row corresponding to the base interest point in the first dataset and the column corresponding to the base interest point in the second dataset, so that the number of matched pairs of objects it represents depends upon the confidence represented by the element of the second array that is in the row corresponding to the satellite interest point in the first dataset and the column corresponding to the satellite interest point in the second dataset;

wherein the greater the confidence represented by the element in the second array, the higher the number of matched pairs of objects represented by the element of the first array after it is adjusted.

The elements of the second array may be initialized to the same default value, for example unity, or may be initialized to different values based upon a priori assumptions. Adjusting the element of the second array so as to increase the confidence it represents may comprise increasing its value by a predetermined quantity, such as unity. By the same token, adjusting the other elements of the second array so as to decrease the confidence they represent may comprise setting their value to zero.

A feature of this setup is that the process of adjusting the value of the element of the first array so that the number of matched pairs of objects it represents depends upon the confidence represented by the element of the second array can be done simply by forming a sum of the values of the elements of the second array. This applies even when the elements of the first array are initialized, which can be done by forming a sum of the default values of the elements of the second array.

In particular, the value of the element of the first array that is in the row corresponding to a base interest point in the first dataset and the column corresponding to a base interest point in the second dataset, can be the sum over all matched pairs of objects that relate the base interest point of the row to a satellite interest point in the first dataset and the base interest point of the column to a satellite interest point in the second dataset, of the values of the elements of the second array that are in the respective row corresponding to the satellite interest point in the first dataset and the respective column corresponding to the satellite interest point in the second dataset. As the reader will recognize, where the initial values of the second array are all unity, the initial values in the first array will be equal to the number of matched pairs of objects that relate the interest point of the corresponding row and the interest point of the corresponding column as base interest points.

Thus, the first array can be constructed from the second array. In particular, the element of the first array that is in the row corresponding to a base interest point in the first dataset and the column corresponding to a base interest point in the second dataset, can be the sum over all matched pairs of objects that relate the base interest point of the row to a satellite interest point in the first dataset and the base interest point of the column to a satellite interest point in the second dataset, of the default values of the elements of the second array that are in the respective row corresponding to the satellite interest point in the first dataset and the respective column corresponding to the satellite interest point in the second dataset.

Drawing these themes together, one embodiment of the invention presented here insofar as it involves the use of both the first and second arrays is a method of matching interest points between images comprising:

from a dataset of interest points in a first image, the dataset comprising information identifying the position, scale and orientation of each interest point, calculating a dataset of objects that each relate a base interest point to a satellite interest point, the calculated dataset comprising information identifying the normalized position of the satellite interest point relative to the base interest point and the normalized scale and orientation of the satellite interest point, in which normalized means expressed relative to the scale and orientation of the base interest point;

from a dataset of interest points in a second image, the dataset comprising information identifying the position, scale and orientation of each interest point, calculating a second dataset of objects that each relate a base interest point to a satellite interest point, the calculated dataset comprising information identifying the normalized position of the satellite interest point relative to the base interest point and the normalized scale and orientation of the satellite interest point, in which normalized means expressed relative to the scale and orientation of the base interest point;

generating matched pairs of objects by matching objects from the first calculated dataset to objects in the second calculated dataset;

constructing a first array in which:
each row of the first array represents a particular base interest point in the first dataset; and
each column of the first array represents a particular base interest point in the second dataset;

constructing a second array in which:
each row of the second array represents a respective interest point in the first dataset;
each column of the second array represents a respective interest point in the second dataset; and
the elements of the second array are used to represent the confidence with which the corresponding interest points have been matched and are initialized to default values;

initializing the elements of the first array, whereby the value of the element of the first array that is in the row corresponding to a base interest point in the first dataset and the column corresponding to a base interest point in the second dataset, is initialized to the sum over all matched pairs of objects that relate the base interest point of the row to a satellite interest point in the first dataset and the base interest point of the column to a satellite interest point in the second dataset, of the default values of the elements of the second array that are in the respective row corresponding to the satellite interest point in the first dataset and the respective column corresponding to the satellite interest point in the second dataset;

locating an element in the first array that has a maximum value to identify the pair of interest points corresponding to the row and column of that array element; and matching the pair of interest points so identified.

Subsequent interest point matches may be detected by:
for the matched pair of interest points:
increasing the value of the element of the second array that is in the row corresponding to the base interest point of the matched pair in the first dataset and the column corresponding to the base interest point of the matched pair in the second dataset so as to increase the confidence it represents; and
easing the value of every other element of the second array that is in the row corresponding to the base interest point of the matched pair in the first dataset or the column corresponding to the base interest point of the matched pair in the second dataset so as to decrease the confidence it represents; and recalculating elements of the first array, whereby the value of the element of the first array that is in the row corresponding to a base interest point in the first dataset and the column corresponding to a base interest point in the second dataset, is the sum over all matched pairs of objects that relate the base interest point of the row to a satellite interest point in the first dataset and the base interest point of the column to a satellite interest point in the second dataset, of the post-adjustment values of the elements of the second array that are in the respective row corresponding to the satellite interest point in the first dataset and the respective column corresponding to the satellite interest point in the second dataset;

locating an element in the first array that has a maximum value to identify the pair of interest points corresponding to the row and column of that array element; and matching the pair of interest points so identified.

The process can be iterated by continuing the following process:

for the newly matched pair of interest points:
increasing the value of the element of the second array that is in the row corresponding to the base interest point of the matched pair in the first dataset and the column corresponding to the base interest point of the matched pair in the second dataset so as to increase the confidence it represents; and decreasing the value of every other element of the second array that is in the row corresponding to the base interest point of the matched pair in the first dataset or the column corresponding to the base interest point of the matched pair in the second dataset so as to decrease the confidence it represents; and recalculating elements of the first array, whereby the value of the element of the first array that is in the row corresponding to a base interest point in the first dataset and the column corresponding to a base interest point in the second dataset, is the sum over all matched pairs of objects that relate the base interest point of the row to a satellite interest point in the first dataset and the base interest point of the column to a satellite interest point in the second dataset, of the post-adjustment values of the elements of the second array that are in the respective row corresponding to the satellite interest point in the first dataset and the respective column corresponding to the satellite interest point in the second dataset;

locating an element in the first array that has a maximum value to identify the pair of interest points corresponding to the row and column of that array element; and matching the pair of interest points so identified;
until a termination condition is met.

Because of the continual updating of the values in the first array, it is possible for a previously matched pair of interest points no longer to satisfy the condition required of a matched pair. This can happen if a pair of interest points is matched in error and subsequent matches expose this, for example by being inconsistent with the pair of interest points matched in error. In such a case, the erroneously matched pair of interest points can be unmatched.

Thus, certain embodiments of the invention may further comprise:

determining whether the value of the element of the first array that is in the row corresponding to a matched interest point and the column corresponding to the interest point with which it is matched represents a number of matched pairs of objects below a predetermined threshold; and on an affirmative determination, rescinding the match.

The match can be rescinded by:
adjusting the element of the second array that is in the row and column corresponding to the interest points of the matched pair whose match is to be rescinded so as to decrease the confidence it represents; and adjusting every other element of the second array that is:
in the row corresponding to the interest point of the matched pair in the first dataset or the column corresponding to the interest point of the matched pair in the second dataset; and not in a row corresponding to the interest point of any other matched pair in the first dataset or the column corresponding to the interest point of any other matched pair in the second dataset;

so as to increase the confidence it represents.

As the reader will understand, adjusting the element of the second array that is in the row and column corresponding to the interest points of the matched pair whose match is to be rescinded may comprise restoring it to its default value, or setting its value to unity. Similarly, adjusting every other element of the second array may comprise restoring it to its default value, or setting its value to unity.

The effect of rescinding the match has been described as it concerns the elements of the second array, but via the propagation of information from the second array to the first, it also affects elements of the first array. Embodiments of the invention where a second array is not used as well as those in which it is may also be implemented to have the same effects on the first array. Thus, certain embodiments may further comprise:

in respect of a matched pair of objects that relates base interest points in the first and second datasets or images to the pair of base interest points whose match has been rescinded as satellite interest points, adjusting the value of the element of the first array that is in the row corresponding to the base interest point in the first dataset or image and the column corresponding to the base interest point in the second dataset or image, so as to decrease the number of matched pairs of objects it represents;

then determining the identity of an unmatched pair of base interest points that have a maximum number of matched pairs of objects relating them; and matching the pair of base interest points whose identities are so determined.

For similar reasons, certain embodiments of the invention may further comprise:

in respect of a matched pair of objects that relates base interest points in the first and second datasets or images to one of the pair of base interest points whose match has been rescinded and one other interest point as satellite interest points, adjusting the value of the element of the first array that is in the row corresponding to the base interest point in the first dataset or image and the column corresponding to the base interest point in the second dataset or image, so as to increase the number of matched pairs of objects it represents;

then determining the identity of an unmatched pair of base interest points that have a maximum number of matched pairs of objects relating them; and matching the pair of base interest points whose identities are so determined.

Either or both processes can be iterated until a termination condition is met.

Embodiments of the invention in which elements of the first array are recalculated may be configured so that only those elements of the first array are recalculated whose value will change as a result of changes to the elements in the second array. This is computationally efficient.

Devices for matching interest points according to embodiments of the invention are also provided and may comprise a data interface and an interest point matching engine configured to operate in accordance with the methods of any embodiment of the invention already discussed, wherein the datasets of interest points or objects are received via the data interface, and further configured to output via the data interface a dataset identifying the interest points that have been matched. Such devices can be implemented using a suitably programmed microprocessor as the interest point matching engine, or using an ASIC or other dedicated hardware. They may be stand-alone devices in which the data interface is a physical interface to another device, or they may be embedded in another device, such as an image sensor chip, in which case the data interface is a logical interface to other components of the same device.

FIG. 1 shows an example image with some interest points 30 superimposed. These interest points 30 can be generated using one of a number of known techniques. For each interest point 30, the radius of the circle indicates the scale of the interest point 30; the radial line indicates its principal direction or orientation. Each interest point 30 can have only one principal direction; however interest points 30 with different directions can be co-located with the same scale.

Figure 2A:
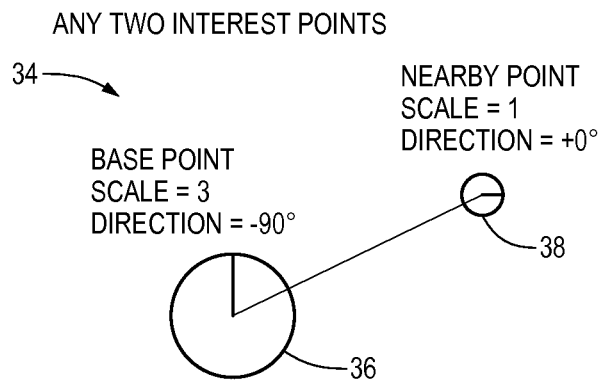
FIG. 2A shows a base interest point and a nearby satellite interest point in accordance with an embodiment of the present invention.
Figure 2B:
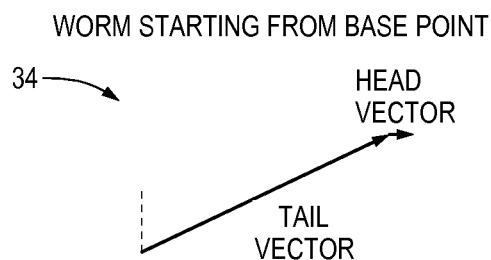
FIG. 2B shows the worm object that relates those two interest points prior to normalization in accordance with an embodiment of the present invention.
Figure 2C:
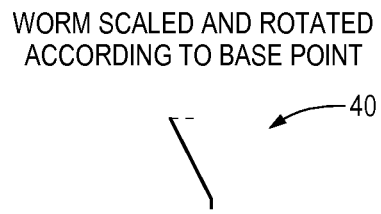
FIG. 2C shows the same worm object after normalization in accordance with an embodiment of the present invention.

The embodiments of the invention presented here introduce the concept of a worm or worm object (sometimes referred to simply as an object where the context allows). A worm 34 relates a base interest point 36 to a satellite interest point 38, usually one that it is nearby, as shown in FIG. 2A. The tail of the worm is the vector linking the centers of the two interest points; the head is a vector that encodes the scale and principal direction of the nearby point, as shown in FIG. 2B. The worm is then normalized, i.e. scaled and rotated according to the base point scale and rotation. Since in the example shown the base point scale is 3 a scaling factor of ⅓ is applied, and since the rotation is −90° a rotation of +90° is applied to get the final normalized worm shown 40 in FIG. 2C, right.

A base point p can be represented as p=[x, y, s, a], where x and y are its Cartesian coordinates, s its scale and a its angle of orientation. Other representations are possible. Mathematically, given a base point $p_i=[x_i, y_i, s_i, a_i]$ and a point $p_j=[x_j, y_j, s_j, a_j]$ which is the $k^{th}$ nearest point to $p_i$, worm $V_{ik}$ can be defined as a 5-element vector:

$$V_{ik}[u_{ij}, v_{ij}, f_{ij}, g_{ij}, j]$$

where j is the index of the $k^{th}$ nearest point to $p_i$ and $u_{ij}$, $v_{ij}$, $f_{ij}$ and $g_{ij}$ are given by:

$$\begin{bmatrix} u_{ij} & f_{ij} \\ v_{ij} & g_{ij} \end{bmatrix} = \begin{bmatrix} \frac{\cos a_i}{s_i} & \frac{-\sin a_i}{s_i} \\ \frac{\sin a_i}{s_i} & \frac{\cos a_i}{s_i} \end{bmatrix} \begin{bmatrix} x_j - x_i & s_j \cos a_j \\ y_j - y_i & s_j \sin a_j \end{bmatrix}.$$

The matrix just to the right of the equals sign represents rotation clockwise by the angle $a_i$ and scaling by $1/s_i$. This is normalization and its purpose is to ensure that if a similar pair of interest points is chosen to form a worm object in another image, the resulting worm will be scaled and rotated into the same orientation and size as the worm derived from the first image so that the two can readily be matched.

As will be understood, the first two elements of the vector, $u_{ij}$ and $v_{ij}$, independently identify the normalized position of the satellite interest point relative to the base interest point. This is the tail of the worm and can be thought of as a two-component vector. The magnitude of the tail vector is $\sqrt{(x_j-x_i)^2+(Y_j-Y_i)^2}/s_i$, which represents the normalized distance between the base and satellite interest points. The direction in which the tail vector points is $a_{ji}-a_i$, where $a_{ji}$ is the direction of the vector from $p_i$ to $p_j$, such that $\tan a_{ji}=(y_j-y_i)/(x_j-x_i)$.

The third and fourth elements of the vector, $f_{ij}$ and $g_{ij}$, independently identify the normalized scale and orientation of the satellite interest point. This is the head of the worm and can again be thought of as a two-component vector. The magnitude of the head vector is $s_j/s_i$, which represents the normalized scale of the satellite interest point. The direction in which the head vector points is $a_j-a_i$, which represents the normalized orientation.

The tail and head vectors are exemplified here as Cartesian vectors (with the y direction being downwards), but the exact representation is not of great importance. The vectors could equally well be represented in polar form, which in some respects is more intuitive, or in another form.

Figure 3:
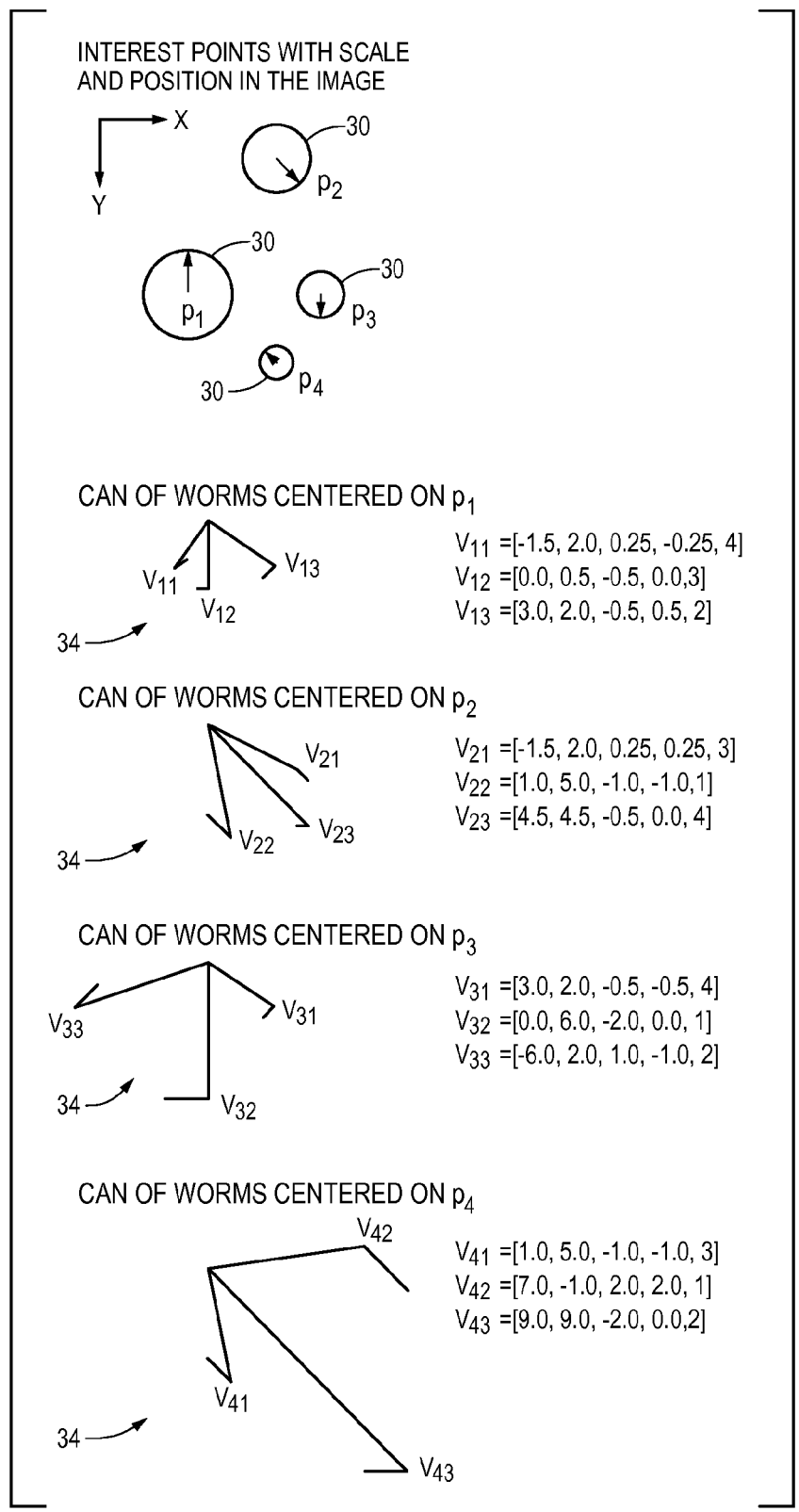
FIG. 3 shows twelve worm objects and their decompositions for four interest points in accordance with an embodiment of the present invention.

One worm does not convey much information about the base point. However, the process can be repeated a number of times, for different nearby satellite interest points. This is illustrated in FIG. 3, where there are four interest points and, using each of them in turn as a base interest point, three worm objects are calculated. These three worm objects link the base interest point to a respective one of the other three interest points.

In general, there will be a finite limit K on the number of worm objects that can practically be managed for matching. The K nearest interest points to the base interest point in question (within a circular radius) can be chosen. On the other hand, if it is known that the image contains something with a certain outline, the decision can be made only to generate the worms that originate and terminate with interest points within that outline. In either case, the end result is a context-adaptive neighborhood (CAN) of worms.

Figure 4A:
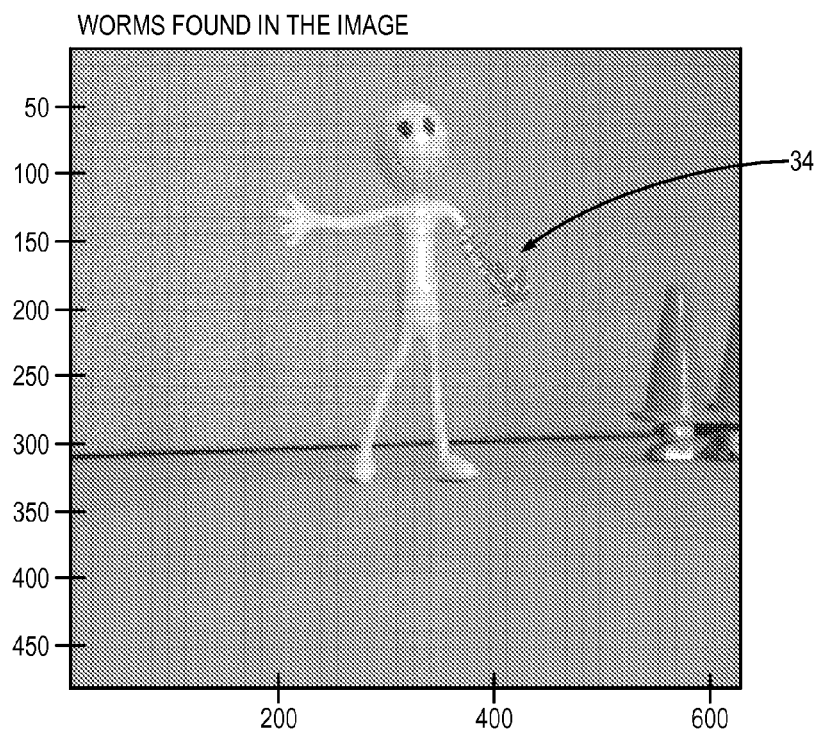
FIGS. 4A and 4B illustrate a single dataset containing 32 worm objects, with FIG. 4A showing the worms in the image and FIG. 4B showing the corresponding scale-invariant worm objects in accordance with an embodiment of the present invention.
Figure 4B:
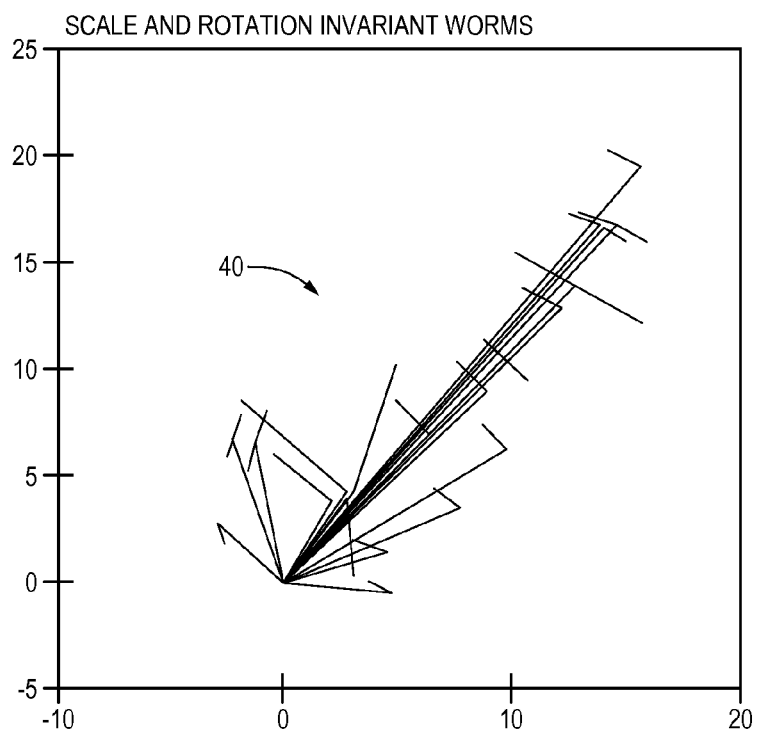

FIG. 4 shows a single CAN containing 32 worms (e.g., worms 34). FIG. 4A shows the worms 34 in the image; FIG. 4B shows the corresponding scale-invariant CAN of worms 40, which may correspond to the worms 34 of FIG. 4A. With sufficient worms in the CAN, this provides a scale- and orientation-invariant description of the interest point, which can be used like a descriptor. However the CAN of worms differs in two important respects:

1) Following the interest point detection (including scale and orientation), no further image processing is required to generate the CAN of worms for each point. Simple vector operations requiring two subtractions and four multiplies per worm are done on the interest points themselves.
2) The information content (total entropy of the scene description) is very low compared with descriptors.

A CAN of worms may be generated about every interest point in the scene.

Following scaling and rotation, it is expected that two matching worms should lie together, with bodies and heads the same length and pointing in the same directions. The extent to which two worms do so can be determined from a measure of the similarity of the worms, of which an example will be presented; there are many similar methods and measures.

Figure 5:
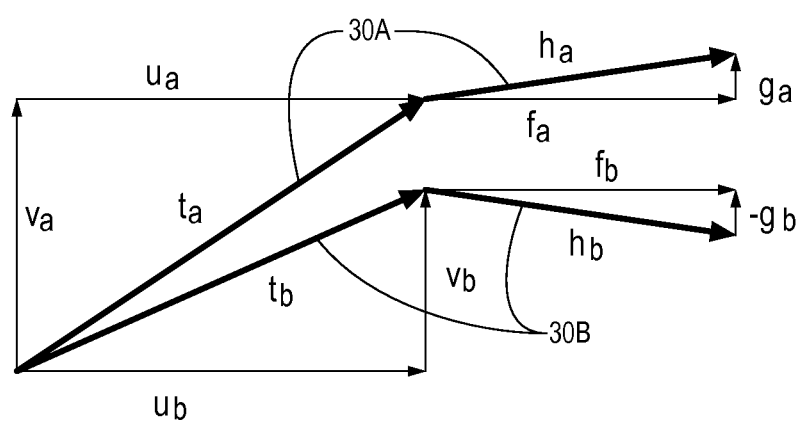
FIG. 5 illustrates two worm objects whose similarity is to be measured in accordance with an embodiment of the present invention.

FIG. 5 illustrates two worm objects 30A and 30B whose similarity is to be measured according to the example presented here. If the $n^{th}$ head vector is denoted $h_n=f_n+ig_n$ on the Argand plane and the $n^{th}$ tail vector $t_n=u_n+iv_n$, then it is expected that:

$$\frac{h_a \times \bar{h}_b}{|h_a|^2} = 1$$

if and only if $h_a=h_b$, and similarly for $t_a$ and $t_b$.

For the avoidance of doubt, the bar represents the complex conjugate, so that:

$$h_a \times \bar{h}_b = f_a \cdot f_b + g_a \cdot g_b + i(g_a \cdot f_b - f_a \cdot g_b);$$

$$t_a \times \bar{t}_b = u_a \cdot u_b + v_a \cdot v_b + i(v_a \cdot u_b - u_a \cdot v_b);$$

$$|h_a|^2 = f_a^2 + g_a^2;$$

$$|t_a|^2 = u_a^2 + v_a^2.$$

It is thus possible to define an error measure (which is real), as follows:

$$\varepsilon(a, b) = \left(\frac{h_a \times \overline{h}_b}{|h_a|^2} - 1\right) \cdot \overline{\left(\frac{h_a \times \overline{h}_b}{|h_a|^2} - 1\right)} +$$
$$\left(\frac{t_a \times \overline{t}_b}{|t_a|^2} - 1\right) \cdot \overline{\left(\frac{t_a \times \overline{t}_b}{|t_a|^2} - 1\right)}$$
$$= \left|\frac{h_a \times \overline{h}_b}{|h_a|^2} - 1\right|^2 + \left|\frac{t_a \times \overline{t}_b}{|t_a|^2} - 1\right|^2.$$

A pair of worms (a, b) are accepted as a match if $\varepsilon(a,b) \leq \sigma^2$ for some error bound $\sigma$, which is a parameter of the system.

The reader will understand that each of the two terms in the expression for $\varepsilon(a,b)$ can be simplified. For example:

$$\left|\frac{h_a \times \overline{h}_b}{|h_a|^2} - 1\right|^2 = \left|\frac{h_a \times \overline{h}_b - h_a \times \overline{h}_a}{h_a \times \overline{h}_a}\right|^2$$
$$= \left|\frac{\overline{h}_b - \overline{h}_a}{\overline{h}_a}\right|^2$$
$$= \frac{|h_b - h_a|^2}{|h_a|^2}.$$

It can thus be seen that the component of the similarity measure determined from the head vectors of the worm is equal to the square of the magnitude of the vector difference divided by the square of the magnitude of the head vector of worm a. The square of the magnitude of the head vector of worm b could have been used instead, as could the product of the two magnitudes. The same applies to the tail vector. Either similarity measure can be multiplied by a constant, for example for use in a weighted sum, or otherwise.

As has been described, the two terms in the overall error measure represent the similarity of the head and tail vectors of the worms in question, respectively. The two terms have been shown added together, but there are many other possibilities which could be followed. For instance, one could choose to evaluate the head and tail vectors separately, and accept a match where both similarity measures are independently small. Or one could apply weighting to the head and tail vectors differently, so that they do not make an equal contribution to the error measure. If additional information is available, such as a descriptor, an error measure between descriptors can readily be incorporated here.

One way of matching two interest points is to declare them to be matched if a sufficiently high number d of worms in the CANs for each of them are found to match one another. To obtain good results, when considering a match between two CANs of worms, the condition may be imposed that a worm in one CAN may match at most one worm in a second CAN. This avoids the possibility of a lot of similar worms from one CAN matching a single worm in the other CAN.

Figure 6:
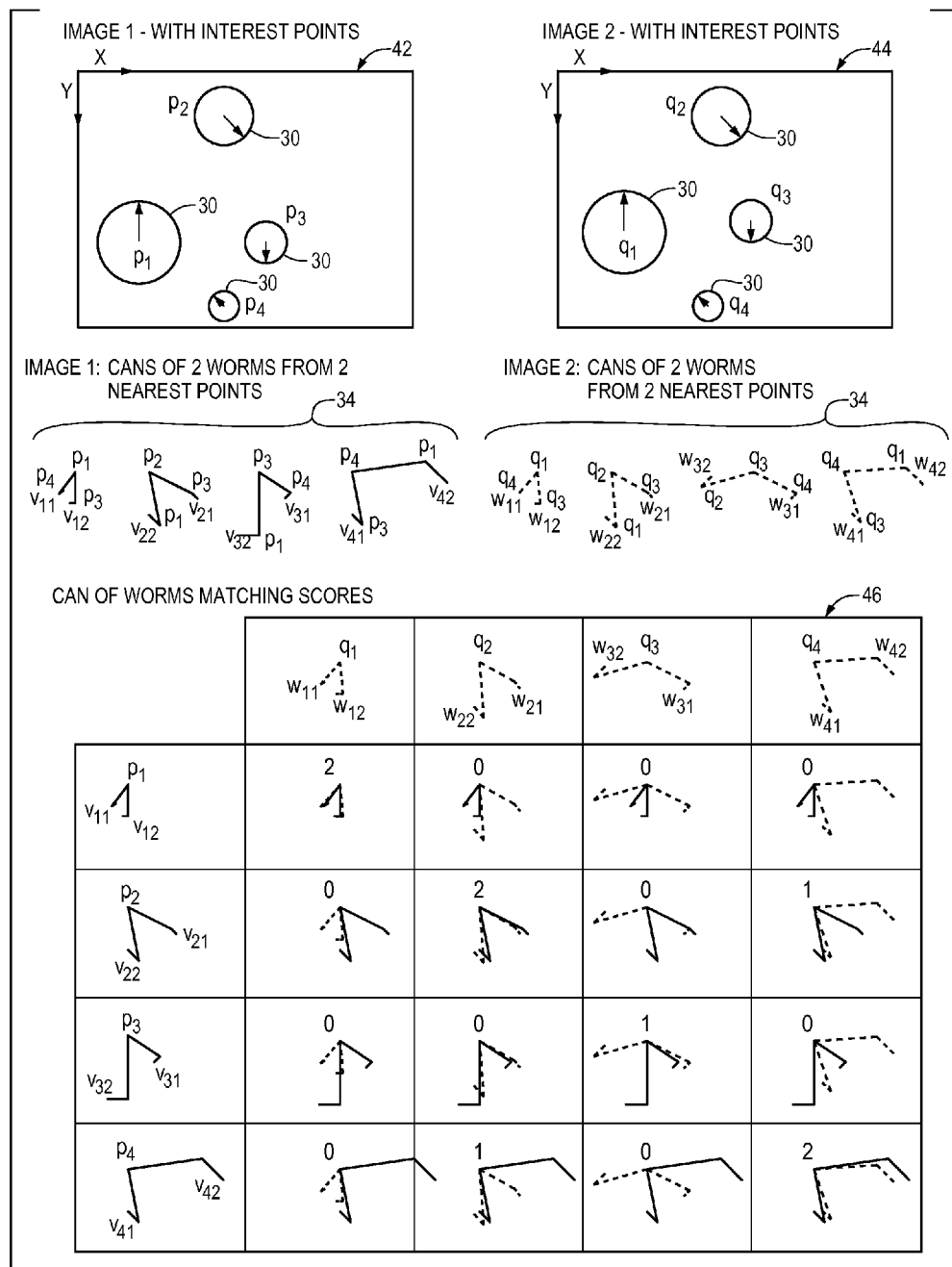
FIG. 6 shows the operation of a basic matching process in accordance with an embodiment of the present invention.

FIG. 6 shows the operation of a basic CAN of worms match. At the top are two images 42 and 44, with sets of interest points 30 in each. Below this is shown a can of two worms for each point, the can of worms being taken from the two nearest points in the same set. Although only two worms are shown, there will in general be a greater number K of worms in each CAN. Thus, the can of worms for point $p_1$ is formed from $p_3$ and $p_4$ etc. Note the difference in the cans of worms for points $p_3$ and $q_4$ due to a small displacement between $p_3$ and $q_3$ which means that $p_1$ is nearer to $p_3$ than is $p_2$ but $q_2$ is nearer to $p_3$ than is $q_1$.

At the bottom of the figure is shown the cross-matching score 46, which here is simply a count of the number of worms that are similar enough to be matched. The worms are superimposed within each cell of the score array to enable the reader to see the discrepancy. In this simple example, it is easy to see that the interest points to be matched are determined from the identities of the interest points and the number of matched pairs that relate them as base interest points.

Note that in this example it has turned out that worms of the same index are the only ones that match. If there are missing points, or points are shifted about a bit more, then this will not be the case. The possibility that worms with a different index are a correct match should not be missed so, for example, $v_{22}$ must be compared with $w_{21}$ as well as $W_{22}$.

A robust algorithm has been developed for finding a dense correspondence between interest points. In essence, it involves choosing the very best matches as true, and using this to increase the score for matches that agree with the chosen matches, whilst decreasing the score for matches which are precluded by the chosen matches. True matches are discovered not because they can directly be found, but because of the weight of evidence from matches that are already decided. This technique is known as belief propagation. It is useful with CANs of worms because of the spatial relativity of the worms. Connecting the heads of two matching worms together means that there is a strong possibility that the tails originated at a point that also matched. Thus, matching one pair of points increases confidence in the match at other points.

An example robust matching algorithm incorporates the following three principles.

Uniqueness: As discussed, the condition can be imposed that an interest point in one image can match at most one interest point in another image. This condition might not apply to certain situations e.g. tracking multiple similar objects with a single template image. But for ordinary video tracking applications this condition is reasonable.

Consistency: A worm that terminates in a matched interest point in one image may only match a worm that terminates in the corresponding matched interest point in the other image.

Boosting: Where a consistent match between worms is found, it is given more weight than a match that is new, i.e. the match between the end points of the worms has not itself been declared a match.

Taken together, these principles allow the development of example algorithms to discover the dense correspondence between interest points. One would expect to discover a dense correspondence between the interest points in similar images, e.g. successive frames of a video or different photographs of the same object.

The last two principles enable the full power of CAN of worms over descriptor matching methods to be realized, because they allow the spatial propagation of information. Boosting means that finding two interest points that match increases one's belief that the points around them (i.e. those that formed the worms that matched to produce the first match) are themselves matched. Conversely, consistency means that if two interest points are already matched, a further match where a worm with one of the matched points at its head matches any other point, cannot be accepted.

The method for finding the dense correspondence between two sets of interest points without using descriptors presented here proceeds in three stages.

1: In step 48, calculate a two-dimensional array of scores for all possible matches between all the points in both sets as the sums of belief in the head matches of worms with sufficient similarity.
2: In steps 50, 52, and 54, check all the previously decided matches to see if they are still good. Delete any matches that are no longer good and update the belief array accordingly.
3: In step 56, find a new match which corresponds to a maximum in the scores of remaining unmatched points. Determine, in step 58, if this score is greater than some critical value, and if this score is greater than that critical value, update, in step 60, the belief array and return to step 48, otherwise terminate the algorithm (in step 62).

Figure 7:
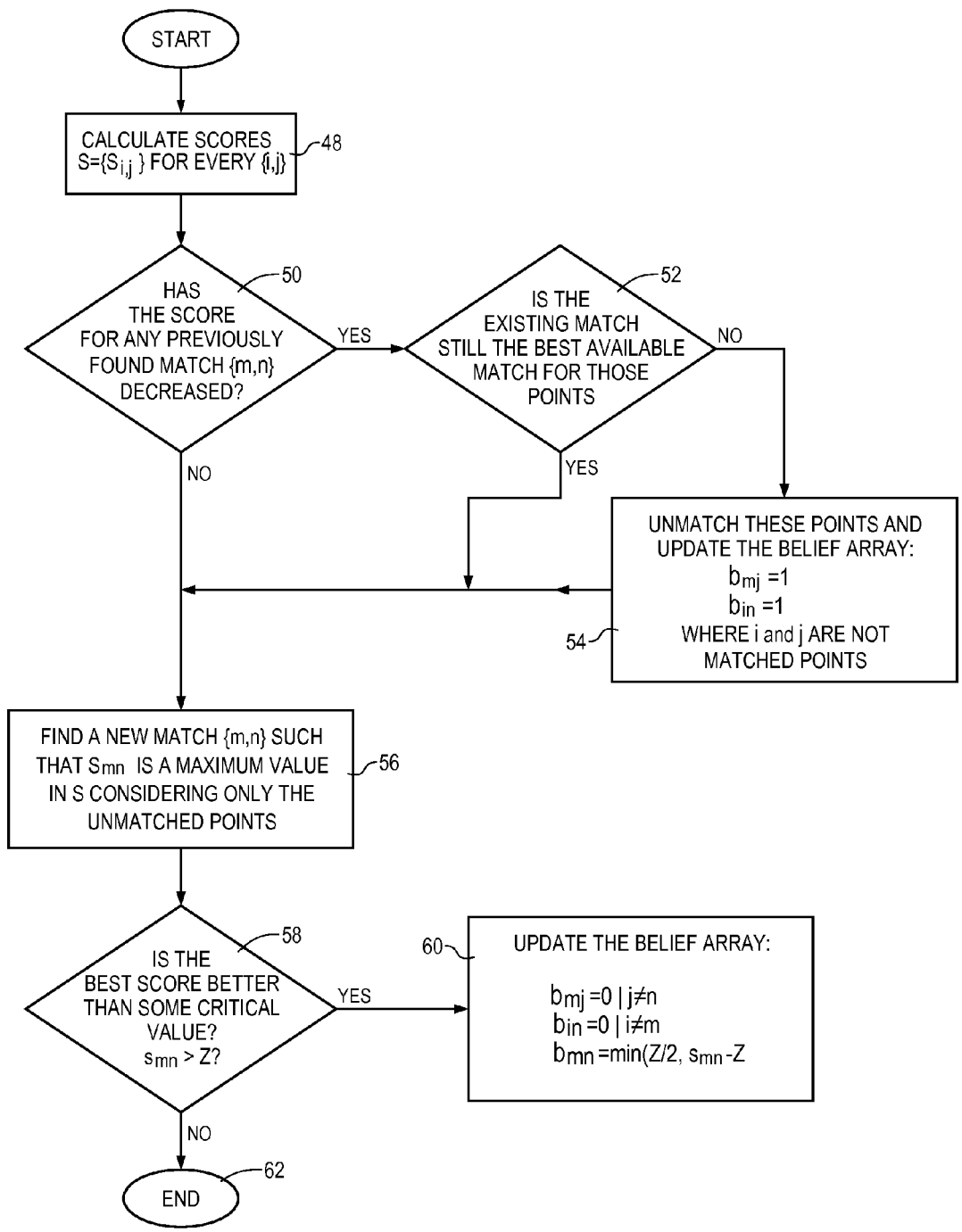
FIG. 7 is a flowchart of an example interest point matching process using arrays in accordance with an embodiment of the present invention.

This is illustrated by the flow chart in FIG. 7.

The algorithm can be terminated for other reasons. For example, if it is run on a computing device and speed is more important than accuracy, it can be terminated after a certain time has elapsed or a certain number of points have been matched.

Figure 8A:
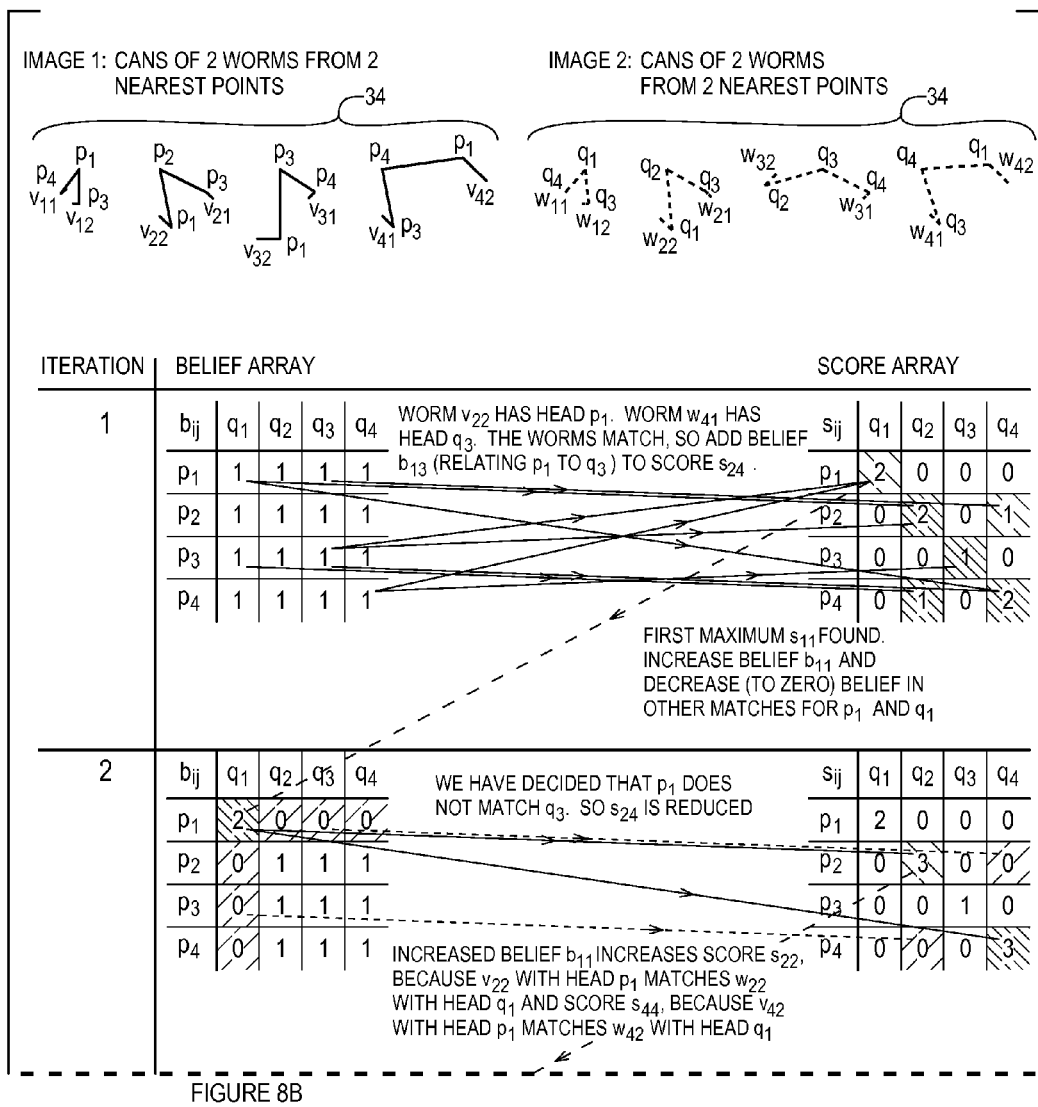
FIG. 8 shows iterations of this process on the example dataset of worm objects from FIG. 6 in accordance with an embodiment of the present invention.

FIG. 8 shows iterations of this algorithm on the example CANs of worms 34 from FIG. 6. In the first iteration, the sums of the belief in the point matches for the head vectors of all the matching worms may be computed.

Picking a maximum in the score array enables a decision to be made that two points are a good match, so the belief in that match is increased at the start of the second iteration, and the belief in the matches that are excluded by the decision just made are decreased. In the example shown, a score of at least 2 may be required to decide that a match is good.

Details of the example algorithm will now be described.

The algorithm begins with two sets of interest points, which will be denoted by $P=\{p_1, p_2, \ldots p_I\}$ and $Q=\{q_1, q_2, \ldots q_J\}$, where each $p_i$ and $q_j$ is an interest point with a location in the image together with a scale and angle of orientation. Thus each $p_i$ is a four-element vector $[x_i, y_i, s_i, a_i]$ and similarly $q_j=[x_j, y_j, s_j, a_j]$.

The goal is to match as many interest points in P with corresponding interest points in Q. Since P and Q will in general come from different images (and may have different thresholds), one cannot assume that P and Q have the same number of elements. Because interest point detection is subject to instability due to differences between the scenes, one cannot even assume that every point in the smaller set has a corresponding point in the larger. The task is simply to find a large number of good matches.

A can of K worms for every point $p_i$ and a can of L worms for every point $q_j$ is computed. The can of worms for $p_i$ is denoted $V_i=\{v_{iK}\}=\{v_{i1} \ldots v_{ik} \ldots v_{iK}\}$, and similarly the can for $q_j$ is denoted $W_j=\{w_{jK}\}=\{w_{j1} \ldots w_{jk} \ldots w_{jK}\}$. Note that since every worm is a five-element vector, the $5^{th}$ element being the head index, one may denote a set of head indices for a can of worms centered on $p_i$ as $v_{iK5}$.

A score matrix $S=\{s_{ij}\}$ represents posterior beliefs about matches between interest points $p_i$ and $q_j$ in each iteration, that is, beliefs about the match having attempted to match the worms.

A representation of prior beliefs about the match is also included, that is, beliefs about the match thus far in each iteration, before any attempt has been made to match the worms in that iteration of the algorithm. Prior beliefs are represented by a belief matrix $B=\{b_{ij}\}$. Each $b_{ij}$ is a scalar that embodies belief that a point $p_i$ matches a point $q_j$. Another way of looking at this is that the elements of matrix B represent the confidence with which the corresponding interest points have been matched. In the absence of any information, a flat prior may be assumed, and thus the algorithm can simply set $b_{ij}=1 \forall i, j$. More intelligent assumptions than a flat prior may apply in certain situations; these will be discussed later.

As has already been discussed, a set or CAN of worms is created around each point. Each worm is a nearby or satellite point, positioned and scaled relative to the base point, as described above. Having done this for the two interest points in FIG. 6, the algorithm assigns a score to any proposed match between those interest points, which is the number of worms the match in both cans. The best match for two sets of continuous data, with a uniqueness constraint, is quite hard to calculate, so an approximation is used and for a worm in the first CAN the algorithm accepts the first worm in the second CAN that is found to be a match. This is an approximation because it might prevent the best match from being found in a situation where the wrong match for the first worm is chosen and that prevents any match for the second worm from being found at all.

For simplicity, assume that every point in P has a constant number of worms K, and every point in Q has a constant number of worms L. A worm centered on point $p_i$ is denoted as $w_{ik}$ and a worm centered on $q_j$ as $w_{jl}$. A head index H must also be defined. The head index identifies the index of the other point that was used to generate a worm $w_{ik}$, thus $H_P=\{h_{ik}\}$ and $H_Q=\{h_{jl}\}$.

A global score $S=\{s_{ij}\}$ for every possible match between the interest points is then calculated. For every combination $1 \leq i \leq I$, $1 \leq j \leq J$, $s_{ij}$ is computed as the sum of the beliefs corresponding to the heads of any matching worms, subject to the constraint that no worm can match more than once for any particular proposed point match $\{i, j\}$. Whilst it would be desirable to compute the best possible match, that is a more difficult calculation. A good match is all that is required. In essence, for every worm $w_{ik}$ a corresponding worm $w_{jl}$ is sought and if the worms are similar, i.e. if $\epsilon(w_{ik}, w_{jl}) \leq \sigma^2$, then $b_{h_{ik}h_{jl}}$ is added to $s_{ij}$.

The condition may be imposed that each worm can only be used once per proposed interest point match, but if two worms cannot possibly match because the belief in the match between the head indices is zero, then that is not counted as a match.

Thus, the $s_{ij}$ can be computed via the following algorithm.

| | |
|---|---|
| for $1 \leq l \leq L$ | 'For every worm in the second set' |
|   $A_l = 1$ | 'Set availability to 1 for all worms $w_{jl}$' |
| end | 'End of for loop' |
| $s_{ij} = 0$ | 'Set initial score to 0' |
| for $1 \leq k \leq K$ | 'For every worm in the first set' |
|   for $1 \leq l \leq L$ | 'For every worm in the second set' |
|     if $(A_l == 1) \times b_{h_{ik}h_{jl}} > 0$ | 'Check availability and belief in this match' |
|       compute $\epsilon(w_{ik}, w_{jl})$ | 'Compute similarity of these two worms' |
|       if $\epsilon(w_{ik}, w_{jl}) \leq \sigma^2$ | 'If worms are similar' |
|         $s_{ij} = s_{ij} + b_{h_{ik}h_{jl}}$ | 'Add belief to score' |
|         $A_l = 0$ | 'Mark this worm in the second set unavailable' |
|         break | 'Break out of this loop in the second set' 'Move on to the next in the first set' |
|       end | 'End of if worms are similar' |
|     end | 'End of check availability and belief' |
|   end | 'End of for every worm in second set' |
| end | 'End of for every worm in first set' |

This is not the only algorithm that can be used to produce a good match. A better match might be obtained in some circumstances by finding the best match for a given $w_{ik}$ and $w_{jl}$, rather than accepting the first match found. However, this would be slower.

A single pair of interest points {m, n} with the strongest match is found from {m, n}=argmax($s_{ij}$). With an initially flat prior $b_{ij}$=1 ∀ i, j, this will be identical to the score as calculated in FIG. 6. In other words, the $s_{ij}$ will initially equal the number of matched pairs that relate the interest points in question as base interest points. This is not essential, however. The same results will be achieved so long as the $s_{ij}$ are a monotonic function of the number of matched pairs that relate the interest points in question as base interest points. The $s_{ij}$ may otherwise represent the number of matched pairs or be related to the number of matched pairs in a way that yields different results if desired. There may be multiple maxima in $s_{ij}$, with the same value, in which case an arbitrary choice is made of one of the maxima, typically the first encountered in a sweep through the matrix S.

If the score is greater than some threshold Z, i.e. $s_{mn}$>Z then it is determined to be a match and the matched interest points are updated. Thus:

$$m_m = n$$

$$n_n = m$$

$$T_m = s_{ij}$$

where $m_m$ represents the point in the second set with which the $m^{th}$ point in the first set is matched;

$n_n$ represents the point in the first set with which the $n^{th}$ point in the second set is matched; and $T_m$ represents the strength of the math between the $m^{th}$ point in the first set and the $m_m^{th}$ point in the second.

Belief $b_{ij}$ is then increased at the matching position and beliefs in matches of the same points in each set with all other points in the other set are decreased. Typically belief in all other matches might be set to zero. Belief is increased according to how well the points are matched, subject to a maximum to prevent runaway values. Typically a new match belief is updated such that for a new match {i, j}={m, n}:

$$b_{ij} = \begin{cases} \min(s_{mn} - Z, Z/2) & i = m, j = n \\ 0 & i = m, j \neq n \\ 0 & i \neq m, j = n \end{cases}$$

The effect of these changes is twofold. Firstly, the element of the belief B array corresponding to the matching position is adjusted so as to increase the confidence it represents in the match. Every other element of the belief array B that is in the same row or column as the matching position is adjusted so as to decrease the confidence it represents. Note that this affects only one row and one column of the belief matrix B.

If the score is less than the threshold the algorithm terminates.

Figure 10:
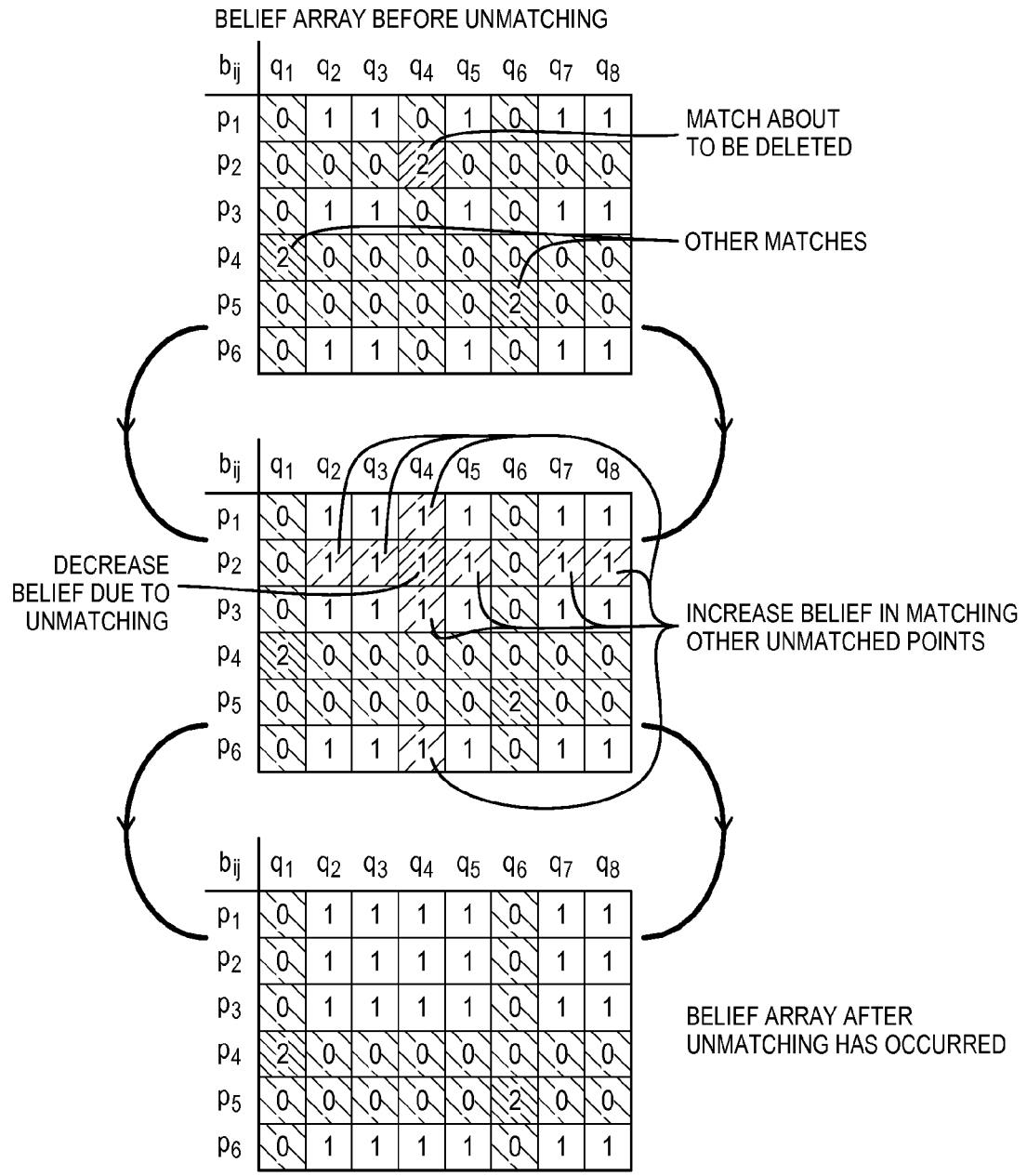
FIG. 10 illustrates an array updating process in accordance with an embodiment of the present invention.

On second and subsequent iterations, before updating the new match, first a check is undertaken of all the previously found matches to ensure that the updated beliefs about other matches have not contradicted this match. This may happen if $s_{ij}$≤Z and the existing match is no longer the best available match for the points in question. If so, this match must be rescinded (by setting $m_m$=0 and $n_n$=0) and the belief array or matrix must be updated accordingly. Part of the belief array is updated so that all other unmatched values once again become possible, with equal probability. This is shown in FIG. 10.

Mathematically:

$$b_{ij} = \begin{cases} 1 & m_i = 0, j = n \\ 1 & i = m, n_j = 0 \\ 0 & m_i > 0, j = n \\ 0 & i = m, n_j > 0 \end{cases}$$

Again, the effect is twofold. The element of the belief array B that corresponds to the rescinded match is adjusted so as to decrease the confidence it represents. Every other element of the belief array B that satisfies the following conditions is adjusted so as to increase the confidence it represents. The first condition is that the element is in the same row or column of the belief array B as the element corresponding to the match to be rescinded. The second condition is that it is not in the same row or column as any other matched point. Again, this affects only one row and column of B.

The process is then iterated until no more matches are found that satisfy $s_{ij}$>Z or until some other termination condition is met. The process of iteration involves first recalculating the components $s_{ij}$ of the score array S in view of the changes that have been made to the belief array B. One way of achieving this is to repeat the process set out in paragraph [00109] above.

One effect of this process, in view of the changes to the belief array B associated with the matching of two interest points, is to increase in the score array S the score associated with each other pair of interest points that meets the following conditions. The first condition is that each one of the other pair of interest points is related as a base interest point to a respective one of the matched interest points as a satellite interest point by a respective worm object. The second condition is that the respective worm objects are matched.

Another effect of the process, in view of the changes to the belief array B associated with the matching of two interest points, is to decrease in the score array S the score associated with each other pair of interest points that meets the following conditions. The first condition is that one of the other pair of interest points is related as a base interest point to one of the matched interest points as a satellite interest point by a worm object. The second condition is that the other one of the other pair of interest points is related as a base interest point to an interest point that is not the other one of the matched interest points as a satellite interest point by a worm object. The third condition is that the two worm objects concerned are matched.

The process also has effects arising from changes to the belief array B associated with the rescinding of a match between two interest points. One effect is to decrease in the score array S the score associated with each other pair of interest points that meets the following conditions. The first condition is that each one of the other pair of interest points is related as a base interest point to a respective one of the matched interest points as a satellite interest point by a respective worm object. The second condition is that the respective worm objects are matched.

Another effect of the process, in view of the changes to the belief array B associated with the rescinding of a match between two interest points, is to increase in the score array S the score associated with each other pair of interest points that meets the following conditions. The first condition is that one of the other pair of interest points is related as a base interest point to one of the matched interest points as a satellite interest point by a worm object. The second condition is that the other one of the other pair of interest points is related as a base interest point to an interest point that is not the other one of the matched interest points as a satellite interest point by a worm object. The third condition is that the two worm objects concerned are matched.

Following the first iteration, the worms whose scores are affected by a change in the belief matrix are only those whose head indices are one of the changed points. Thus, rather than repeating the process set out in paragraph [00109], only the scores for the points which have a worm with a head index for which the belief has changed need to be updated.

Thus, for a linked or an unlinked match $\{m, n\}$ only $s_{\hat{i}j}$ and $s_{i,\hat{i}}$ need to be updated, where $\hat{I}=\{i|m \in v_{iK5}\}$ and $\hat{J}=\{j|m \in w_{jK5}\}$. Rather than lists of points $\hat{I}$ and $\hat{J}$, update arrays of bit flags can be used, such that:

$$r_i = \begin{cases} 0 & i \in \hat{I} \\ 1 & \text{otherwise} \end{cases}$$

$$c_j = \begin{cases} 0 & j \in \hat{I} \\ 1 & \text{otherwise} \end{cases}$$

The algorithm presented thus far has is known to possess loops in the graph. In mathematical parlance, a graph is a set of lines linking points. The effect of a loop, particularly a short loop of a handful of connections, is to trap the algorithm so that it makes one change, makes another change, and after a few cycles returns to the same state. Hence it keeps going around forever unless terminated owing to the amount of time elapsed.

To avoid this, a penalty can be imposed at the unlink stage. If a match is unlinked then a flip score $F=\{f_i\}, G=\{g_i\}$, which is initially zero, is increased for both the m and the n for the unlinked indices.

The best match criterion can be modified to become $\{m, n\}=\text{argmax}(s_{ij}-f_i-g_j)$ and the acceptance criterion to become $s_{mn}-f_m-g_n>Z$. This means that every time round a loop in the graph, the points that have already been matched and unmatched are biased against, making it more likely that some other point will be chosen as the best.

Figure 9:
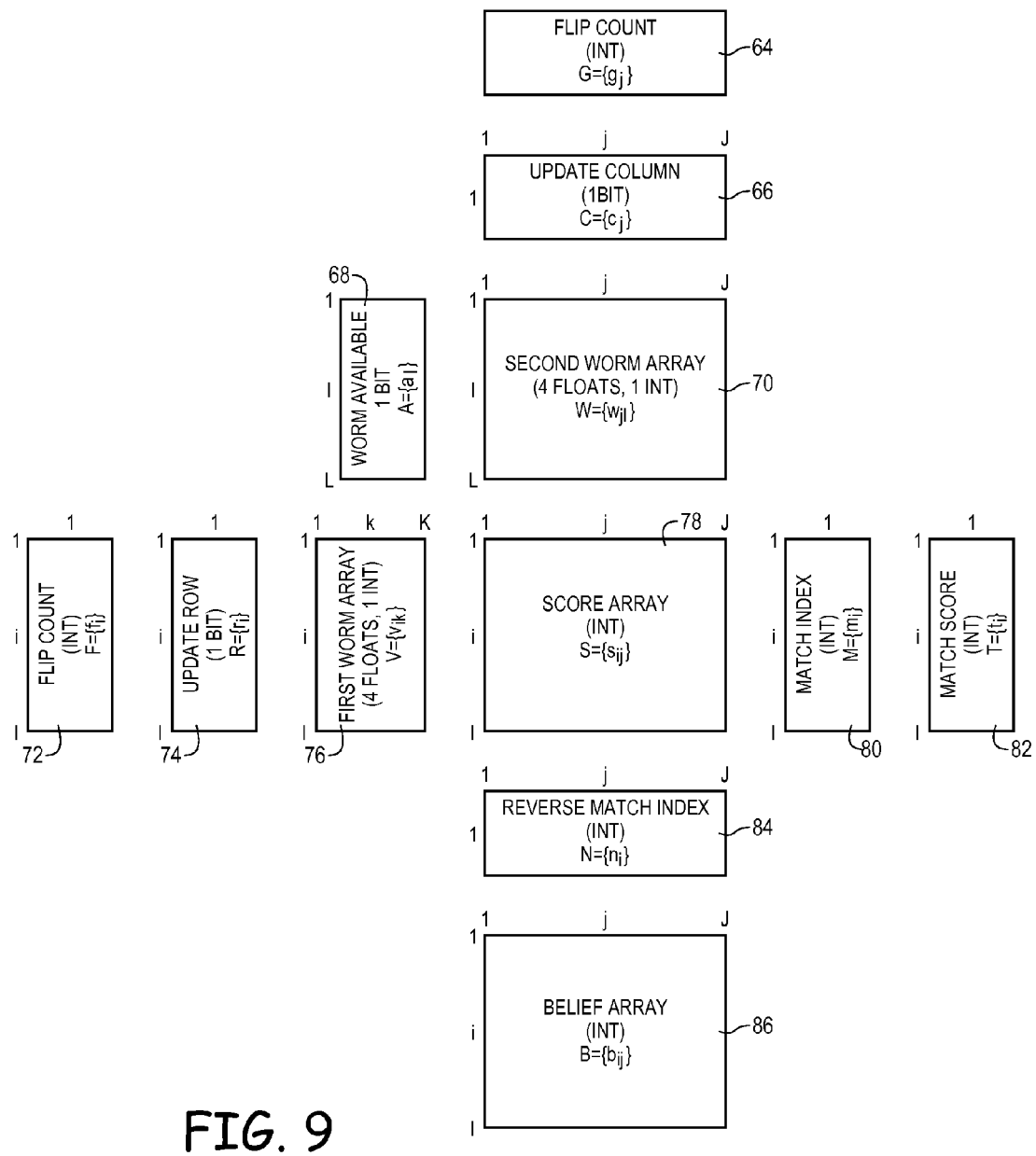
FIG. 9 illustrates the data structures and arrays that may be used in example algorithms in accordance with an embodiment of the present invention.

As illustrated in FIG. 9, the algorithms described make use of the following data structures:
the flip count array $G=\{g_j\}$ 64 is a 1×J, integer array, where J is the number of points in the second set;
the update column array $C=\{c_j\}$ 66 is a 1×J, 1-bit array;
the worm available array $A=\{a_l\}$ 68 is an L×1, 1-bit array, where L is the number of worms in a CAN in the second set;
the second worm array $W=\{w_{ij}\}$ 70 is an L×J, 4-float, 1-integer array, where the 4 floats encode the head and tail vectors and the integer is the head index;
the flip count array $F=\{f_i\}$ 72 is an I×1, integer array, where I is the number of points in the first set;
the update row array $R=\{r_i\}$ 74 is an I×1, integer array;
the first worm array $V=\{v_{ik}\}$ 76 is an I×K, 4-float, 1-integer array, where K is the number of worms in a CAN in the first set, the 4 floats encode the head and tail vectors and the integer is the head index;
the score array $S=\{s_{ij}\}$ 78 is an I×J, integer array;
the first match index array $M=\{m_i\}$ 80 is an I×1, integer array;
the match score array $T=\{t_i\}$ 82 is an I×1, integer array;
the second or reverse match index array $N=\{n_j\}$ 84 is an 1×J, integer array; and
the belief array $B=\{b_{ij}\}$ 86 is an I×J, integer array.

Figure 11A:
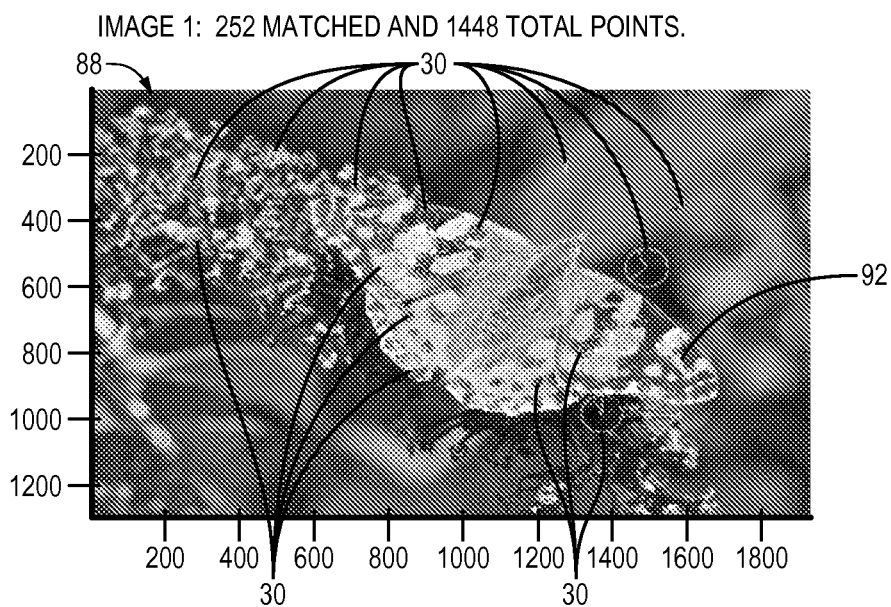
FIG. 11 shows the results of the application of the example algorithm in accordance with an embodiment of the present invention.
Figure 11B:
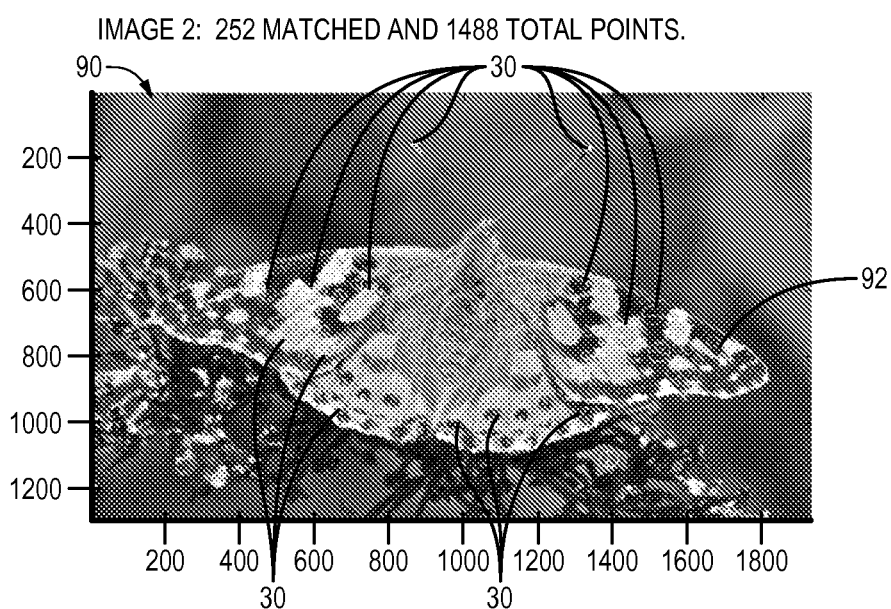
Figure 11C:
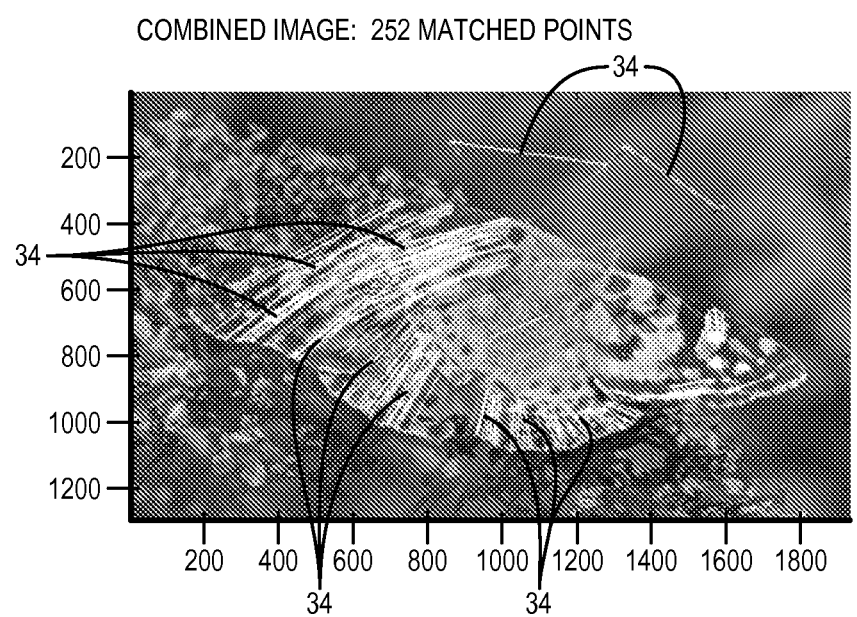
Figure 12:
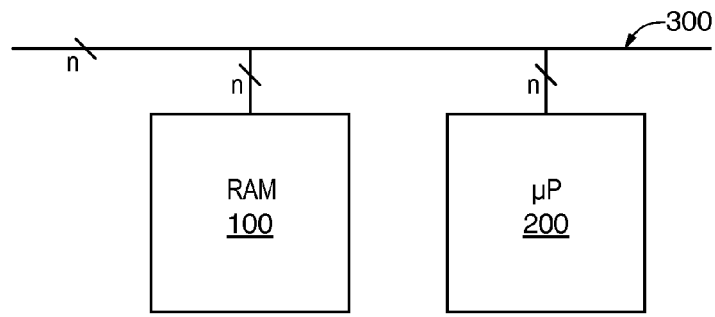
FIG. 12 illustrates a device for matching interest points between images using the algorithms described in accordance with an embodiment of the present invention.

Results of the application of the algorithm of this invention are illustrated in FIG. 11. Two pictures 88 and 90 of a Vanessa butterfly 92 were analyzed using 31 worms 34 per CAN, and 252 matched points 30 were identified. FIGS. 11A and 11B show the interest points 30 on individual pictures 88 and 90. FIG. 11C shows the matched interest points (e.g., worms 34) on superimposed images, confirming the accuracy of the results obtained.

As illustrated, the device comprises a RAM 100 and a μP CPU 200 connected in parallel to a common bus 300. The common bus 300 forms a data interface for the RAM 100 and the CPA 200. The RAM 100 contains the data structure of FIG. 9 and a set of instructions for the CPU 200, according to which the CPU is configured to operate in accordance with the methods described. The datasets of interest points or objects are received via the common bus, for example from a data storage device or an image sensor. The CPU 200 is configured to output a dataset identifying the interest points that have been matched via the bus 300, either to a data storage device or to another device for subsequent processing, such as object recognition.

The CPU 200 can be replaced by a DSP, state machine or ASIC that may contain the RAM 100 as embedded memory. In this case, the RAM contains the data structures, but not the instructions as these will be hardwired into the device.

Figure 13:
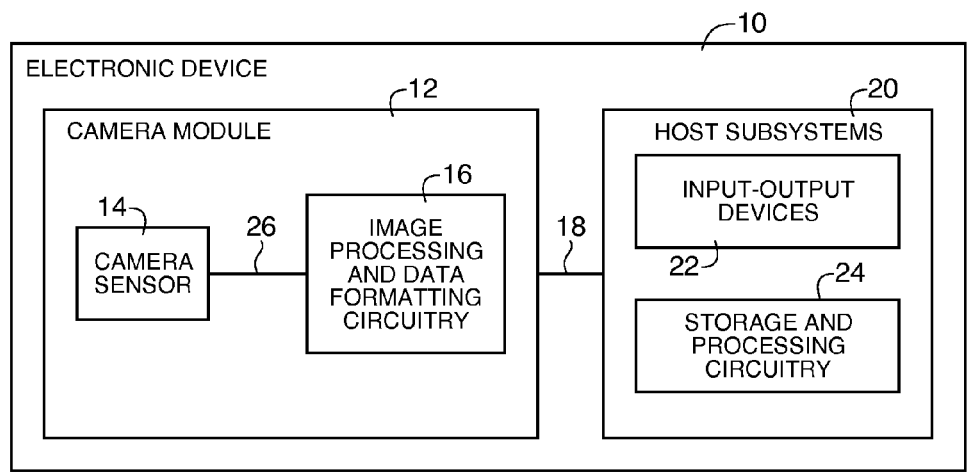
FIG. 13 is a diagram of an illustrative electronic device that may include processing circuitry that matches interest points between two or more images in accordance with an embodiment of the present invention.

An electronic device with a digital camera module is shown in FIG. 13. Electronic device 10 of FIG. 13 may, as examples, be used in matching interest points as described in connection with FIGS. 1-12 of this application. Electronic device 10 may include hardware, software running on circuitry, and other components and elements that may be utilized in implementing the arrangements described in connection with FIGS. 1-12 of this application.

Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

The foregoing is merely illustrative of the principles of this invention which can be practiced in other embodiments.

What is claimed is:

1. A method of matching interest points between images comprising:
   from a dataset of interest points in a first image, the dataset comprising information identifying the position, scale and orientation of each interest point, calculating a first dataset of objects that each relate a base interest point to a satellite interest point, the calculated dataset comprising information identifying the normalized position of the satellite interest point relative to the base interest point and the normalized scale and orientation of the satellite interest point, wherein normalized means expressed relative to the scale and orientation of the base interest point;
   from a dataset of interest points in a second image, the dataset comprising information identifying the position, scale and orientation of each interest point, calculating a second dataset of objects that each relate a base interest point to a satellite interest point, the calculated dataset comprising information identifying the normalized position of the satellite interest point relative to the base interest point and the normalized scale and orientation of the satellite interest point, wherein normalized means expressed relative to the scale and orientation of the base interest point;
   generating matched pairs of objects by matching objects from the first calculated dataset to objects in the second calculated dataset;
   from the matched pairs of objects, determining the interest points in the first dataset that are to be matched with interest points in the second dataset; and
   matching the interest points accordingly, wherein, for each base interest point in the first dataset of interest points, the first calculated dataset of objects contains objects that relate that base interest point to a set of satellite interest points that is at most a subset of the remaining interest points in the first dataset of interest points and wherein, for each base interest point in the second dataset of interest points, the second calculated dataset of objects contains objects that relate that base interest point to a set of satellite interest points that is at most a subset of the remaining interest points in the second dataset of interest points.

2. The method of claim 1, wherein the subset of the remaining interest points in the first dataset of interest points contains the n interest points that are closest in position to the base interest point in question, where n is an integer.

3. The method of claim 2, wherein the subset of the remaining interest points in the second dataset of second interest points contains only the n interest points that are closest in position to the base interest point in question, where n is an integer.

4. The method of claim 3 wherein n is at least 16.

5. The method of claim 4 wherein n is at most 64.

6. The method of claim 5, comprising:
   for each of a plurality of base interest points in the first dataset of interest points, identifying as satellite interest points a set of the n remaining interest points in the first dataset of interest points that are closest to the interest point in question; and
   for each of the n satellite interest points so identified in the first dataset of interest points, calculating an object that relates the base interest point to the satellite interest point, comprising information identifying the normalized position of the satellite interest point relative to the base interest point and the normalized scale and orientation of the satellite interest point, wherein normalized means expressed relative to the scale and orientation of the base interest point.

7. The method of claim 6, comprising:
   for each of a plurality of base interest points in the second dataset of interest points, identifying as satellite interest points a set of the n remaining interest points in the second dataset of interest points that are closest to the interest point in question; and
   for each of the n satellite interest points so identified in the second dataset of interest points, calculating an object that relates the base interest point to the satellite interest point, comprising information identifying the normalized position of the satellite interest point relative to the base interest point and the normalized scale and orientation of the satellite interest point, wherein normalized means expressed relative to the scale and orientation of the base interest point.

8. The method of claim 7 wherein each of the objects in the first dataset of objects includes a first component and a second component, the first component independently identifying the normalized position of the satellite interest point relative to the base interest point and the second component independently identifying the normalized scale and orientation of the satellite interest point and wherein each of the objects in the second dataset of objects includes a first component and a second component, the first component independently identifying the normalized position of the satellite interest point relative to the base interest point and the second component independently identifying the normalized scale and orientation of the satellite interest point.

9. A method of matching interest points between images comprising:
   from a first dataset of objects that each relate a base interest point to a satellite interest point in a first image, the first dataset comprising information identifying the normalized position of the satellite interest point relative to the base interest point and the normalized scale and orientation of the satellite interest point, wherein normalized means expressed relative to the scale and orientation of the base interest point, and a second dataset of objects that each relate a base interest point to a satellite interest point in a second image, the second dataset comprising information identifying the normalized position of the satellite interest point relative to the base interest point and the normalized scale and orientation of the satellite interest point, generating matched pairs of objects by matching objects from the first dataset to objects in the second dataset;
   constructing a first array wherein:
      each row of the first array represents a particular interest point in the first image;
      each column of the first array represents a particular interest point in the second image; and each element of the first array has a value that represents the number of matched pairs of objects that relate the interest point of the corresponding row and the interest point of the corresponding column as base interest points;

locating an element in the first array that has a value representing a maximum number of matched pairs of objects to identify the pair of interest points corresponding to the row and column of that array element; and matching the pair of interest points so identified, wherein the first array is constructed by:

initializing the elements of the first array to default values representative of no matched pairs of objects; and for every matched pair of objects that relates an interest point in the first dataset or image and an interest point in the second dataset or image as base interest points, adjusting the value of the element of the first array that is in the row corresponding to the interest point in the first dataset or image and the column corresponding to the interest point in the second dataset or image, so as to increase by one the number of matched pairs of objects it represents, wherein:

each element of the first array has a value equal to the number of matched pairs of objects that relate the interest point of the corresponding row and the interest point of the corresponding column as base interest points.

10. The method of claim 9 wherein the first array is constructed by:

initializing the elements of the first array to zero; and for every matched pair of objects that relates an interest point in the first dataset or image and an interest point in the second dataset or image as base interest points, increasing by one the value of the element of the first array that is in the row corresponding to the interest point in the first dataset or image and the column corresponding to the interest point in the second dataset or image.

11. The method of claim 10 further comprising:

in respect of a matched pair of objects that relates a base interest point to a satellite interest point in the first dataset or image and a base interest point to a satellite interest point in the second dataset or image, for which the satellite interest point in the first dataset or image and the satellite interest point in the second dataset or image are a matched pair, adjusting the value of the element of the first array that is in the row corresponding to the base interest point in the first dataset or image and the column corresponding to the base interest point in the second dataset or image, so as to increase the number of matched pairs of objects it represents;

then identifying an unmatched pair of interest points that have a maximum number of matched pairs of objects relating them as base interest points; and matching the pair of base interest points so identified.

12. The method of claim 10 comprising:

in respect of all matched pairs of objects that relate base interest points to satellite interest points in the first dataset or image and base interest point to satellite interest points in the second dataset or image, for which the respective satellite interest point in the first dataset or image and the respective satellite interest point in the second dataset or image are a matched pair, adjusting the value of the element of the first array that is in the row corresponding to the respective base interest point in the first dataset or image and the column corresponding to the respective base interest point in the second dataset or image, so as to increase the number of matched pairs of objects it represents;

then identifying an unmatched pair of base interest points that have a maximum number of matched pairs of objects relating them as base interest points; and matching the pair of base interest points whose identities are so determined.

13. The method of claim 12 further comprising:

in respect of a matched pair of objects that relates base interest points in the first and second datasets or images to the pair of base interest points whose identities are so determined as satellite interest points, adjusting the value of the element of the first array that is in the row corresponding to the base interest point in the first dataset or image and the column corresponding to the base interest point in the second dataset or image, so as to increase the number of matched pairs of objects it represents;

then determining the identity of an unmatched pair of base interest points that have a maximum number of matched pairs of objects relating them; and matching the pair of base interest points whose identities are so determined.

14. The method of claim 13 further comprising:

until a termination condition is met, continuing, in respect of matched pairs of objects that relate base interest points to the pair of base interest points whose identities are so determined as satellite interest points, to adjust the values of the corresponding elements of the first array, so as to increase the number of matched pairs of objects they represent, to determine the identities of an unmatched pair of base interest points that have a maximum number of matched pairs of objects relating them and to match the pairs of base interest points whose identities are so determined.

15. The method of claim 14 further comprising:

in respect of a matched pair of objects that relates base interest points in the first and second datasets or images to one of the pair of base interest points whose identities are so determined and one other interest point as satellite interest points, adjusting the value of the element of the first array that is in the row corresponding to the base interest point in the first dataset or image and the column corresponding to the base interest point in the second dataset or image, so as to decrease the number of matched pairs of objects it represents;

then determining the identity of an unmatched pair of base interest points that have a maximum number of matched pairs of objects relating them; and matching the pair of base interest points whose identities are so determined.

16. A method of matching interest points between images comprising:

from a dataset of interest points in a first image, the dataset comprising information identifying the position, scale and orientation of each interest point, calculating a first dataset of objects that each relate a base interest point to a satellite interest point, the calculated dataset comprising information identifying the normalized position of the satellite interest point relative to the base interest point and the normalized scale and orientation of the satellite interest point, wherein normalized means expressed relative to the scale and orientation of the base interest point;

from a dataset of interest points in a second image, the dataset comprising information identifying the position, scale and orientation of each interest point, calculating a second dataset of objects that each relate a base interest point to a satellite interest point, the calculated dataset comprising information identifying the normalized position of the satellite interest point relative to the base interest point and the normalized scale and orientation of the satellite interest point, wherein normalized means expressed relative to the scale and orientation of the base interest point;

generating matched pairs of objects by matching objects from the first calculated dataset to objects in the second calculated dataset;

constructing a first array wherein:
    each row of the first array represents a particular base interest point in the first dataset; and
    each column of the first array represents a particular base interest point in the second dataset;

constructing a second array wherein:
    each row of the second array represents a respective interest point in the first dataset;
    each column of the second array represents a respective interest point in the second dataset; and the elements of the second array are used to represent the confidence with which the corresponding interest points have been matched and are initialized to default values;

initializing the elements of the first array, whereby the value of the element of the first array that is in the row corresponding to a base interest point in the first dataset and the column corresponding to a base interest point in the second dataset, is initialized to the sum over all matched pairs of objects that relate the base interest point of the row to a satellite interest point in the first dataset and the base interest point of the column to a satellite interest point in the second dataset, of the default values of the elements of the second array that are in the respective row corresponding to the satellite interest point in the first dataset and the respective column corresponding to the satellite interest point in the second dataset;

locating an element in the first array that has a maximum value to identify the pair of interest points corresponding to the row and column of that array element; and matching the pair of interest points so identified.

17. The method of claim 1 further comprising:

identifying an object in the first image, wherein the object has a first outline in the first image, wherein calculating the first dataset of objects comprises calculating the first dataset of objects from a first subset of the dataset of interest points in the first image, and wherein the first subset is limited to interest points that lie within the outline of the object in the first image; and identifying the object in the second image, wherein the object has a second outline in the second image, wherein calculating the second dataset of objects comprises calculating the first dataset of objects from a second subset of the dataset of interest points in the second image, and wherein the second subset is limited to interest points that lie within the outline of the object in the second image.

* * * * *